(12) United States Patent
Li et al.

(10) Patent No.: US 10,462,778 B2
(45) Date of Patent: *Oct. 29, 2019

(54) METHOD, BASE STATION, AND USER EQUIPMENT FOR COMMUNICATING DOWNLINK CONTROL INFORMATION

(71) Applicant: Huawei Device Co., Ltd., Shenzhen, Guangdong (CN)

(72) Inventors: Yingyang Li, Shenzhen (CN); Chi Gao, Shenzhen (CN)

(73) Assignee: Huawei Device (Shenzhen) Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/942,565

(22) Filed: Apr. 1, 2018

(65) Prior Publication Data

US 2018/0227892 A1 Aug. 9, 2018

Related U.S. Application Data

(63) Continuation of application No. 15/398,661, filed on Jan. 4, 2017, now Pat. No. 9,967,871, which is a (Continued)

(30) Foreign Application Priority Data

Mar. 16, 2012 (CN) .......................... 2012 1 0070953

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0044* (2013.01); *H04L 5/0053* (2013.01);
(Continued)

(58) Field of Classification Search
CPC ........... H04W 72/042; H04W 72/0453; H04W 72/04; H04W 28/065; H04L 5/0053; H04L 5/06; H04L 27/2601; H04L 5/0044
See application file for complete search history.

(56) References Cited

U.S. PATENT DOCUMENTS

2005/0220000 A1 10/2005 Kim et al.
2009/0247175 A1 10/2009 Van Rensburg et al.
(Continued)

FOREIGN PATENT DOCUMENTS

CN 102355732 A 2/2012
CN 102368759 A 3/2012

OTHER PUBLICATIONS

3GPP TSG RAN WG1 Meeting #68 R1-120411,"Mapping Design for E-PDCCH in Rel-11",NTT DOCOMO,Feb. 6-10, 2012,total 7 pages.
(Continued)

*Primary Examiner* — Brian D Nguyen
(74) *Attorney, Agent, or Firm* — Huawei Technologies Co., Ltd.

(57) ABSTRACT

The application pertains to a method for communicating a downlink control signal. A base station maps a physical downlink control channel (PDCCH) sequentially to resource elements for transmitting the PDCCH in each orthogonal frequency division multiplexing (OFDM) symbol according to an order of OFDM symbols used by the PDCCH of a user equipment (UE). The PDCCH is sent to the UE from the base station by using the resource elements. Because the PDCCH is mapped sequentially to resource elements for transmitting the PDCCH in each OFDM symbol according to an order of OFDM symbols used by the PDCCH of the UE, different control channel elements of PDCCHs at different aggregation levels will not include a same PDCCH
(Continued)

modulation symbol, thereby ensuring that the UE judges a start position of the PDCCH correctly.

31 Claims, 15 Drawing Sheets

Related U.S. Application Data continuation of application No. 14/484,272, filed on Sep. 12, 2014, now abandoned, which is a continuation of application No. PCT/CN2012/079446, filed on Jul. 31, 2012.

(51) Int. Cl.
| | | |
|---|---|---|
| *H04L 5/06* | (2006.01) | |
| *H04L 27/26* | (2006.01) | |
| *H04W 28/06* | (2009.01) | |

(52) U.S. Cl.
CPC .......... *H04L 5/06* (2013.01); *H04L 27/2601* (2013.01); *H04W 72/0453* (2013.01); *H04W 28/065* (2013.01); *H04W 72/04* (2013.01)

(56) References Cited

U.S. PATENT DOCUMENTS

| | | | |
|---|---|---|---|
| 2010/0098020 A1 | 4/2010 | Kim et al. | |
| 2010/0290376 A1 | 11/2010 | Dai et al. | |
| 2011/0268062 A1 | 11/2011 | Ji et al. | |
| 2012/0051270 A1 | 3/2012 | Chen et al. | |
| 2012/0093261 A1 | 4/2012 | Kim et al. | |
| 2012/0281636 A1* | 11/2012 | Xiao | H04B 7/024 370/329 |
| 2012/0282936 A1* | 11/2012 | Gao | H04L 5/0023 455/450 |
| 2013/0039284 A1* | 2/2013 | Marinier | H04L 5/001 370/329 |
| 2013/0039291 A1* | 2/2013 | Blankenship | H04L 5/001 370/329 |
| 2013/0070689 A1 | 3/2013 | Liu et al. | |
| 2013/0107816 A1 | 5/2013 | Iraji et al. | |
| 2013/0107861 A1 | 5/2013 | Cheng et al. | |
| 2013/0114517 A1* | 5/2013 | Blankenship | H04L 5/0053 370/329 |
| 2013/0114521 A1 | 5/2013 | Frenne et al. | |
| 2013/0155872 A1* | 6/2013 | Subramanian | H04W 24/06 370/242 |
| 2013/0163447 A1 | 6/2013 | Koskela et al. | |
| 2013/0195067 A1 | 8/2013 | Khoshnevis et al. | |
| 2013/0201840 A1 | 8/2013 | Sorrentino et al. | |
| 2013/0235812 A1* | 9/2013 | Heo | H04L 5/001 370/329 |

OTHER PUBLICATIONS

3GPP TSG RAN WG1 Meeting #68 R1-120733,"Control channel regions for E-PDCCH",Control channel regions for E-PDCCH,Feb. 6-10, 2012,total 3 pages.

3GPP TSG RAN WG1 #68 Meeting R1-120734,"Considerations on search spaces for the E-PDCCH",Nokia, Nokia Siemens Networks,Feb. 6-10, 2012, total 5 pages.

3GPP TSG RAN WG1 Meeting #68 R1-120735,"Multiplexing of E-PDCCH for different users",Nokia, Nokia Siemens Networks,Feb. 6-10, 2012,total 4 pages.

3GPP TS 36.211 V10.4.0 (Dec. 2011),3rd Generation Partnership Project;Technical Specification Group Radio Access Network;Evolved Universal Terrestrial Radio Access (E-UTRA);Physical Channels and Modulation(Release 10), Dec. 2011,total 101 pages.

3GPP TS 36.212 V10.5.0 (Mar. 2012),3rd Generation Partnership Project;Technical Specification Group Radio Access Network;Evolved Universal Terrestrial Radio Access (E-UTRA);Multiplexing and channel coding(Release 10),dated Mar. 2012,total 79 pages.

3GPP TS 36.213 V10.5.0 (Mar. 2012),3rd Generation Partnership Project;Technical Specification Group Radio Access Network;Evolved Universal Terrestrial Radio Access (E-UTRA);Physical layer procedures(Release 10),dated Mar. 2012,total 125 pages.

3GPP TS 36.214 V10.1.0 (Mar. 2011),3rd Generation Partnership Project;Technical Specification Group Radio Access Network; Evolved Universal Terrestrial Radio Access (E-UTRA);Physical layer;Measurements(Release 10),dated Mar. 2011,total 13 pages.

3GPP TS 36.331 V10.5.0 (Mar. 2012),3rd Generation Partnership Project;Technical Specification Group Radio Access Network;Evolved Universal Terrestrial Radio Access (E-UTRA);Radio Resource Control (RRC);Protocol specification (Release 10),dated Mar. 2012,total 302 pages.

3GPP TS 36.201 V10.0.0 (Dec. 2010),3rd Generation Partnership Project;Technical Specification Group Radio Access Network;Evolved Universal Terrestrial Radio Access (E-UTRA);LTE physical layer; General description(Release 10), dated Dec. 2010,total 13 pages.

\* cited by examiner

| 7 | 8 | 9 | 10 | 7 | 8 | 9 | 10 | 7 |
|---|---|---|---|---|---|---|---|---|
| 8 | 8 | 10 | 10 | 8 | 8 | 10 | 10 | |
| 9 | 9 | 9 | 9 | 9 | 9 | 9 | 9 | |
| 10 | 10 | 10 | 10 | 10 | 10 | 10 | 10 | |
| RB0 | | | RB1 | | | RB2 | | |
| RBG0 | | | | | | | | |

One physical resource block pair includes four eCCEs

One physical resource block pair includes two eCCEs

METHOD, BASE STATION, AND USER EQUIPMENT FOR COMMUNICATING DOWNLINK CONTROL INFORMATION

CROSS-REFERENCE TO RELATED APPLICATIONS

This application is a continuation of U.S. application Ser. No. 15/398,661, filed on Jan. 4, 2017, which is a continuation of U.S. application Ser. No. 14/484,272, filed on Sep. 12, 2014. U.S. application Ser. No. 14/484,272 is a continuation of International Application No. PCT/CN2012/079446, filed on Jul. 31, 2012. The International Application claims priority to Chinese Patent Application No. 201210070953.6, filed on Mar. 16, 2012. All of the aforementioned patent applications are hereby incorporated by reference in their entireties.

TECHNICAL FIELD

Embodiments of the present invention relate to the field of communications technologies, and in particular, to a method, a base station, and a user equipment for transmitting a downlink control signal.

BACKGROUND

In a 3GPP ($3^{rd}$ Generation Partnership Project) LTE (Long Term Evolution)/LTE-A (LTE-advanced) system, a downlink multiple access mode generally used is an orthogonal frequency division multiple access (OFDMA) mode. In terms of time, downlink resources of the system are divided into orthogonal frequency division multiplexing (OFDM) symbols, and in terms of frequency, the downlink resources of the system are divided into subcarriers.

In LTE release 8, LTE release 9 and LTE release 10, one downlink subframe includes two timeslots, and each timeslot includes 7 or 6 OFDM symbols, so that a downlink subframe includes 14 or 12 OFDM symbols. One physical resource block (PRB) includes 12 subcarriers in a frequency domain, and one timeslot in a time domain, which means that one PRB includes 7 or 6 OFDM symbols. A subcarrier in an OFDM symbol is called a resource element (RE), and therefore one PRB includes 84 or 72 REs. In one subframe, two PRBs of two timeslots at a same frequency position are called a physical resource block pair; and in LTE, a resource granularity of downlink transmission is a physical resource block (PRB) pair.

In LTE release 10 and earlier LTE systems, a physical downlink control channel (PDCCH) and a physical downlink shared channel (PDSCH) are time-division multiplexed in one subframe. The PDCCH is borne on the first n symbols of a subframe, and downlink data that the PDCCH schedules is mapped from the $(n+1)^{th}$ symbol of the subframe. In one subframe, all PDCCHs scheduling user equipments (UEs) are multiplexed together, and are then sent in a PDCCH area. One PDCCH may be formed by 1, 2, 4 or 8 control channel elements (CCEs); one CCE is formed by 9 resource element groups (REGs); and one REG occupies 4 REs.

In LTE release 10 and earlier LTE systems, according to an index of the first CCE of a downlink grant (DL_grant) for scheduling a UE, that is, a start position of an enhanced physical downlink control channel (E-PDCCH), a physical uplink control channel (PUCCH) format 1a/1b channel may be determined in an implicit manner to bear acknowledgement/negative-acknowledgement (ACK/NACK) feedback information for downlink data transmission.

As control information in a PDCCH is obtained by means of convolutional encoding with master code being 1/3 and circular buffering based rate matching, when an encoding rate is less than 1/3, it may occur that different CCEs include a same modulation symbol. For example, when the PDCCH is formed by 4 CCEs, each including 72 bits, the PDCCH can carry totally 288 encoded bits. Assuming that the PDCCH originally has 48 bits, the bit number becomes 144 after the 1/3 encoding, and becomes 288 after the circular buffering based rate matching, which is equivalent to a repetition encoding; and the 288 bits are finally mapped to the four CCEs of the PDCCH. Therefore, modulation symbols in the third CCE and the fourth CCE are completely the same as modulation symbols in the first CCE and the second CCE.

Under the foregoing situation, a base station sends a PDCCH at aggregation level (AL) 4, but when performing blind detection, a UE may possibly detect information in the third CCE and the fourth CCE as a PDCCH at aggregation level 2. Therefore, the UE may determine a PUCCH format 1a/1b channel in an implicit manner according to an index of the first CCE of the PDCCH at aggregation level 2, that is, an index of the third CCE. However, the base station may regard that the PUCCH format 1a/1b channel allocated to the UE is determined by the first CCE, so that feedback information cannot be correctly transmitted. It can be seen that unclearness of the CCE detection (that is, incorrect judgment on the start position of the E-PDCCH) will lead to unclearness of the PUCCH format 1a/1b channel determined by the UE.

In a LTE system later than release 10, with introduction of a multi-user multi-input multi-output (MIMO) antenna system and coordinated multi-point (CoMP) transmission and like technologies, a control channel capacity is restricted. Therefore, a PDCCH, which is transmitted based on a MIMO pre-coding mode is introduced and the PDCCH can be demodulated based on a UE-specific reference signal, that is, a demodulation reference signal (DMRS), and the PDCCH here is also called an E-PDCCH. An E-PDCCH is not in a control area of the first n symbols of a subframe, but is in a downlink data transmission area of the subframe. E-PDCCH is frequency-division multiplexed with a PDSCH, and may occupy a different PRB pair from that occupied by the PDSCH. Alternatively, an E-PDCCH and a PDSCH may be multiplexed in a same PRB pair. In addition, a group of PRB pairs for E-PDCCH(s) may be configured for a cell, so that each UE in the cell knows all the PRB pairs for E-PDCCH(s) that are configured by a base station. Or, a PRB pair for E-PDCCH transmission may be configured for each UE, which means that PRB pairs for E-PDCCHs that different UEs need to detect may be different.

Using LTE release 11 as an example, a reference signal of an E-PDCCH is a UE-specific reference signal, and can support 4 ports (that is, DMRS ports 7, 8, 9 and 10 for PDSCH demodulation in LTE release 10). A data part of an E-PDCCH is used to bear modulation symbols of control information after coding and modulation.

An E-PDCCH CCE, hereinafter called an eCCE, is also defined in LTE release 11. Using a localized E-PDCCH as an example, there are many REs that can be used to transmit an E-PDCCH in a PRB pair, and these REs may further be divided into several eCCEs. An E-PDCCH is formed by one or more eCCEs by means of aggregation, and needs to be blindly detected by a UE. As control information in the E-PDCCH is also obtained by means of convolutional encoding with master code being 1/3 and circular buffering based rate matching, a problem also exists that a UE judges a start position of the E-PDCCH incorrectly.

SUMMARY

Embodiments of the present invention provide a method, a base station, and a user equipment for transmitting a downlink control signal, that a UE judging a start position of an E-PDCCH incorrectly can be avoided.

According to one aspect, a method for transmitting a downlink control signal is provided. The method includes: mapping, by a base station according to an order of OFDM symbols used by a physical downlink control channel E-PDCCH of a user equipment UE, the E-PDCCH sequentially to resource elements used to transmit the E-PDCCH in each OFDM symbol; and sending, by the base station, the E-PDCCH to the UE by using the resource elements.

According to another aspect, a method for transmitting a downlink control signal is provided. The method includes: receiving, by a user equipment UE, a downlink subframe from a base station; and extracting, by the UE in a blind detection process according to an order of OFDM symbols used by a candidate E-PDCCH in the downlink subframe, modulation symbols of the candidate E-PDCCH sequentially from resource elements used to transmit the candidate E-PDCCH in each OFDM symbol, and performing decoding and cyclic redundancy check CRC on the candidate E-PDCCH.

According to another aspect, a method for transmitting a downlink control signal is provided. The method includes: determining, by a base station, a reference signal port according to an aggregation level of a physical downlink control channel E-PDCCH of a user equipment UE, where E-PDCCHs at different aggregation levels correspond to different reference signal ports, and the aggregation level indicates the quantity of control channel elements included in the E-PDCCH; and sending, by the base station, the E-PDCCH to the UE in a subframe, and sending a reference signal of the E-PDCCH to the UE by using the determined reference signal port.

According to another aspect, a method for transmitting a downlink control signal is provided. The method includes: receiving, by a user equipment UE from a reference signal port in a subframe, a reference signal of a candidate E-PDCCH sent by a base station, where candidate E-PDCCHs at different aggregation levels correspond to different reference signal ports, and the aggregation level indicates the quantity of control channel elements included in the candidate E-PDCCH; and performing, by the UE, channel estimation according to the reference signal, so as to demodulate the candidate E-PDCCH.

According to another aspect, a method for transmitting a downlink control signal is provided. The method incoudes: sending, by a base station, a reference signal of the E-PDCCH by using a first reference signal port v; sending, by the base station, a reference signal of the PDSCH by using at least one second reference signal port; and determining, by the base station, not to use a second reference signal port p(v) to send the reference signal of the PDSCH, so that a reference signal port of the E-PDCCH and a reference signal port of the PDSCH are processed based on orthogonal time extensions with different lengths, where the first reference signal port is one of the at least one second reference signal port, and v and p(v) are serial numbers of the reference signal ports.

According to another aspect, a method for transmitting a signal is provided. The method includes: receiving, by a user equipment UE, a reference signal of a physical downlink control channel E-PDCCH which is sent by a base station by using a first reference signal port v and a reference signal of a physical downlink shared channel PDSCH which is sent by the base station by using at least one second reference signal port, where the PDSCH is invoked by the E-PDCCH; performing, by the UE, channel estimation by using the reference signal of the E-PDCCH, so as to demodulate the E-PDCCH, and performing channel estimation by using the reference signal of the PDSCH, so as to demodulate the PDSCH; and determining, by the UE, not to use a reference signal of the PDSCH sent by a second reference signal port p(v) to perform channel estimation, so that a reference signal port of the E-PDCCH and a reference signal port of the PDSCH are processed based on orthogonal time extensions with different lengths, where the first reference signal port is one of the at least one second reference signal port, and v and p(v) are serial numbers of the reference signal ports.

According to another aspect, a base station is provided. The base station includes: a mapping unit, configured to map, according to an order of OFDM symbols used by a physical downlink control channel E-PDCCH of a user equipment UE, the E-PDCCH sequentially to resource elements used to transmit the E-PDCCH in each OFDM symbol; and a sending unit, configured to send the E-PDCCH to the UE by using the resource elements.

According to another aspect, a user equipment is provided. The user equipment includes: a receiving unit, configured to receive a downlink subframe from a base station; and an extracting unit, configured to extract, in a blind detection process according to an order of OFDM symbols used by a candidate E-PDCCH in the downlink subframe, modulation symbols of the candidate E-PDCCH sequentially from resource elements used to transmit the candidate E-PDCCH in each OFDM symbol, and perform decoding and CRC check on the candidate E-PDCCH.

According to another aspect, a base station is provided. The base station includes: a determining unit, configured to determine a reference signal port according to an aggregation level of a physical downlink control channel E-PDCCH of a user equipment UE, where E-PDCCHs at different aggregation levels correspond to different reference signal ports, and the aggregation level indicates the quantity of control channel elements included in the E-PDCCH; and a sending unit, configured to send the E-PDCCH to the UE in a subframe, and send a reference signal of the E-PDCCH to the UE by using the determined reference signal port.

According to another aspect, a user equipment is provided. The user equipment includes: a sending unit, configured to receive a reference signal of a candidate E-PDCCH from a reference signal port in a subframe, where candidate E-PDCCHs at different aggregation levels correspond to different reference signal ports, and the aggregation level indicates the quantity of control channel elements included in the candidate E-PDCCH; and a demodulating unit, configured to perform channel estimation according to the reference signal, so as to demodulate the candidate E-PDCCH.

According to another aspect, a base station is provided. The base station includes: a sending unit, configured to send a reference signal of the E-PDCCH by using a first reference signal port v, and send a reference signal of the PDSCH by using at least one second reference signal port; and a determining unit, configured to determine not to use a second reference signal port p(v) to send the reference signal of the PDSCH, so that a reference signal port of the E-PDCCH and a reference signal port of the PDSCH are processed based on orthogonal time extensions with different lengths, where the first reference signal port is one of the at least one second reference signal port, and v and p(v) are serial numbers of the reference signal ports.

According to another aspect, a user equipment is provided. The user equipment includes: a receiving unit, configured to receive a reference signal of a physical downlink control channel E-PDCCH which is sent by a base station by using a first reference signal port v and a reference signal of a physical downlink shared channel PDSCH which is sent by the base station by using at least one second reference signal port, where the PDSCH is invoked by the E-PDCCH; a demodulating unit, configured to perform channel estimation by using the reference signal of the E-PDCCH, so as to demodulate the E-PDCCH, and perform channel estimation by using the reference signal of the PDSCH, so as to demodulate the PDSCH; and a determining unit, configured to determine not to use a reference signal of the PDSCH sent by a second reference signal port p(v) to perform channel estimation, so that a reference signal port of the E-PDCCH and a reference signal port of the PDSCH are processed based on orthogonal time extensions with different lengths, where the first reference signal port is one of the at least one second reference signal port, and v and p(v) are serial numbers of the reference signal ports.

In the technical solutions, the E-PDCCH can be mapped, according to an order of OFDM symbols used by an E-PDCCH of a UE, sequentially to resource elements used to transmit the E-PDCCH in each OFDM symbol, so that different control channel elements will not include a same E-PDCCH modulation symbol, thereby avoiding that the UE incorrectly judges a start position of the E-PDCCH.

BRIEF DESCRIPTION OF DRAWINGS

The following briefly introduces the accompanying drawings used in describing the embodiments.

DESCRIPTION OF EMBODIMENTS

The following describes the technical solutions in the embodiments of the present invention with reference to the accompanying drawings.

It should be understood that technical solutions of the present invention may be applied to various communications systems. Such systems include GSM (Global System of Mobile communication) systems, CDMA (Code Division Multiple Access) systems, WCDMA (Wideband Code Division Multiple Access) systems, GPRS (General Packet Radio Service) systems, LTE (Long Term Evolution) systems, LTE-A (Advanced long term evolution) systems, UMTS (Universal Mobile Telecommunication Systems), and the like. For the convenience of description, the embodiments of the present invention will be described by using an LTE system network as an example.

The embodiments of the present invention may be applied to wireless networks under different standards. A radio access network may include different network elements in different systems. For example, network elements of a radio access network in LTE and LTE-A include an eNB (Evolved Node B, evolved base station), while network elements of a radio access network in WCDMA includes a radio network controller (RNC) and a base station Node B. Similarly, a WiMax (Worldwide Interoperability for Microwave Access) and other wireless networks may also use solutions similar to those in the embodiments of the present invention, but a relevant module in a base station system may be different, which is not limited in the embodiments of the present invention, but for convenience of description, the following embodiments will be described by using an eNodeB as an example.

It should be further understood that, in the embodiments of the present invention, a user equipment (UE) includes but is not limited to a mobile station (MS), a mobile terminal, a mobile telephone, a handset, a portable device, or the like. The user equipment may communicate with one or more core networks through a radio access network (RAN). For example, the user equipment may be a mobile phone (or called a "cellular" phone), a computer with a radio communication function, or the like; and the user equipment may also be a portable, pocket-sized, handheld, computer-embedded, or vehicle-mounted mobile device.

Figure 1:
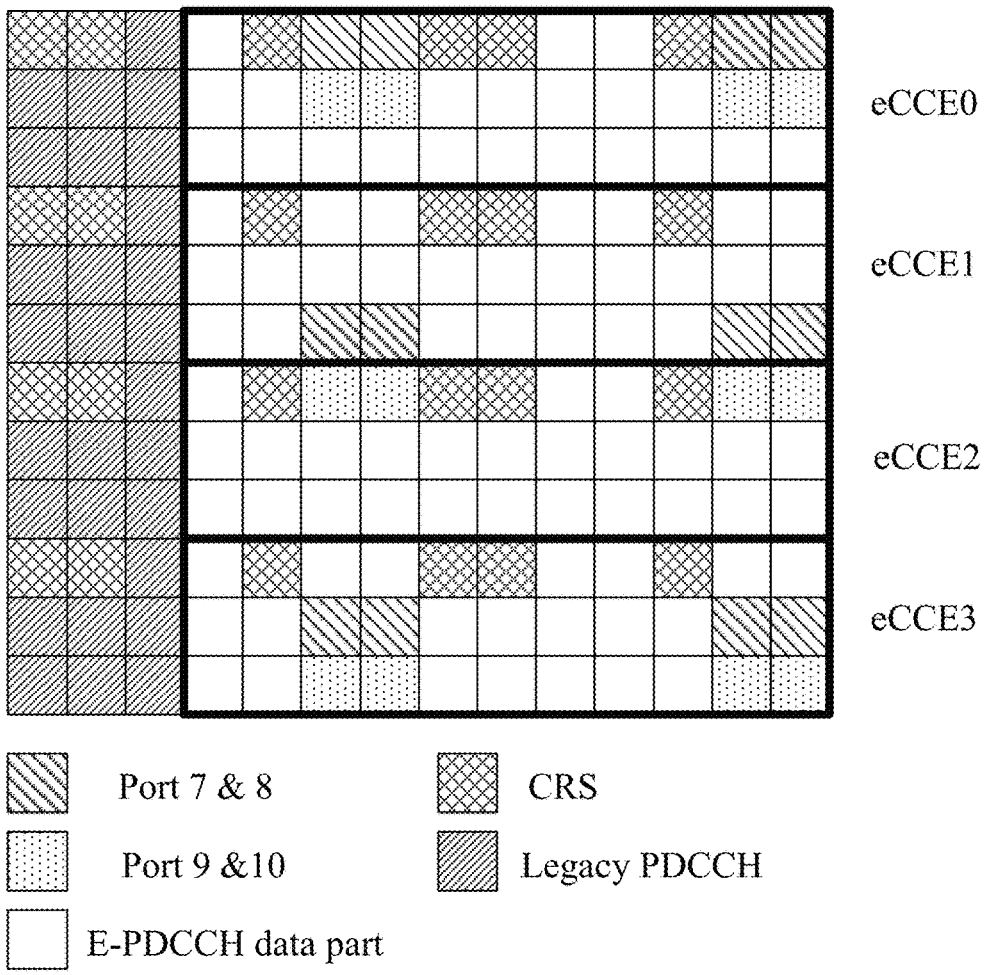
FIG. 1 is a schematic diagram of an eCCE division according to an embodiment of the present invention.

FIG. 1 is a schematic diagram of an eCCE division according to an embodiment of the present invention. Referring to FIG. 1, after REs occupied by cell-specific reference signals (CRS), REs occupied by a later compatible control channel (for example, a legacy PDCCH) and REs occupied by a reference signal of an E-PDCCH are excluded, each PRB pair may be divided into 4 eCCEs. FIG. 1 shows a possible division method. The embodiment according to the present invention is not limited to this eCCE division method, and does not limit that all eCCEs should have the same number of REs. An E-PDCCH and a PDSCH are multiplexed in an FDM mode in a data area of a subframe. Transmission of an E-PDCCH is formed by two parts, that is, a reference signal part and a data symbol part.

According to an E-PDCCH mapping mode, E-PDCCHs may be classified into localized E-PDCCHs and distributed E-PDCCHs. A localized E-PDCCH is mapped in one PRB pair or adjacent PRB pairs in a centralized way, so that a base station can select, according to a channel state report of a UE, a PRB pair in a better channel condition to send the E-PDCCH, so as to obtain a frequency scheduling gain. A distributed E-PDCCH is dispersed and mapped to multiple PRB pairs, so as to obtain a frequency diversity benefit. The embodiment according to the present invention is described by using a localized E-PDCCH as an example.

The foregoing problem that a UE judges a start position of an E-PDCCH incorrectly may be solved by adding a filling bit, for example, by finding, according to sizes of different E-PDCCH formats and numbers of CCEs of different CCE aggregations, sizes of all E-PDCCHs that are possible to cause unclearness of a feedback information resource, and making a list. If a base station detects that the quantity of original bits of an E-PDCCH that needs to be sent meets any one in the above list, the base station will add a zero behind the original bits of the E-PDCCH. The E-PDCCH corrected by adding a zero prevents the mentioned problem that different eCCEs transmit same encoded E-PDCCH information. However, this method increases feedback overhead.

In addition, although the method of adding a filling bit solves the problem that a UE judges a start position of an E-PDCCH incorrectly, a problem cannot be avoided that the UE identifies an aggregation level of the E-PDCCH incorrectly. An E-PDCCH formed by 4 eCCEs is still used as an example. As a filling bit is added, it is impossible for the UE to detect an E-PDCCH at aggregation level 2 on the third eCCE and the fourth eCCE, but still possible that the UE detect an E-PDCCH at aggregation level 2 on the first eCCE and the second eCCE. As the E-PDCCH is sent in a data area of a subframe, and is multiplexed with a PDSCH based on FDM, if the aggregation level detection is incorrect, transmission of the PDSCH will possibly be affected. For example, it is assumed that one RBG has 3 PRB pairs, and one PRB pair has two eCCEs; that the base station sends an E-PDCCH at aggregation level 4 to a UE, which occupies 4 eCCEs of PRB pairs numbered 0 and 1 in RBG0; and that resources allocated to the PDSCH are RBG0 and RBG1, where resources in RBG0 other than those for the E-PDCCH, can be used to transmit the PDSCH, which is to say, PDSCH resources that the base station allocates are PRB pairs numbered 2, 3, 4 and 5. During E-PDCCH blind detection at a UE end, if the UE detects an E-PDCCH at aggregation level 2 on a PRB pair numbered 0, the UE regards that the PDSCH occupies PRB pairs numbered 1, 2, 3, 4 and 5, thereby causing an incorrect PDSCH reception. In addition, a similar problem will also occur when an E-PDCCH and a PDSCH are multiplexed in a same PRB pair.

Embodiment 1

Figure 2:
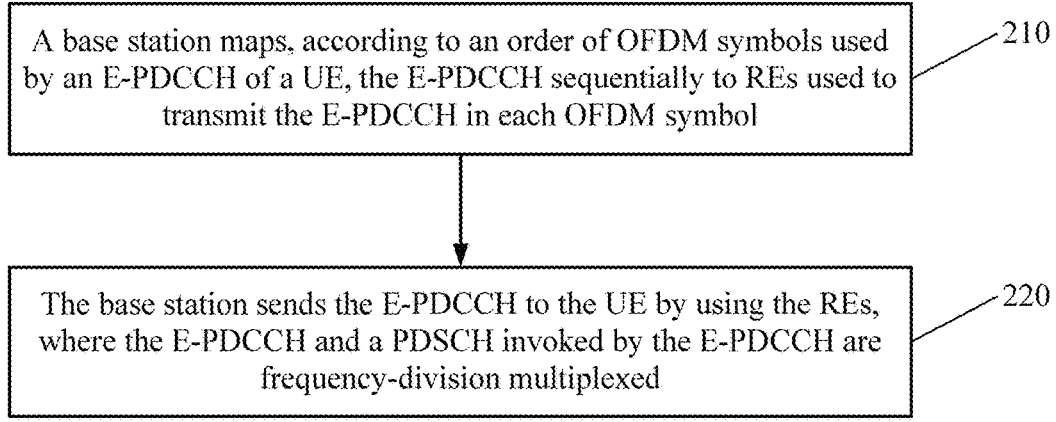
FIG. 2 is a schematic flowchart of a method for transmitting downlink control information according to Embodiment 1 of the present invention.

FIG. 2 is a schematic flowchart of a method for transmitting downlink control information according to Embodiment 1 of the present invention. The method in FIG. 2 may be executed by a base station.

210: A base station maps, according to an order of OFDM symbols used by an E-PDCCH of a UE, the E-PDCCH sequentially to REs used to transmit the E-PDCCH in each OFDM symbol.

For example, each E-PDCCH may include L (L=1, 2, 4 or 8) eCCEs; that is to say, REs used by the E-PDCCH may be divided into L eCCEs. Assuming that OFDM symbols used by the E-PDCCH of the UE are symbols from the $n^{th}$ symbol to the $m^{th}$ symbol, when physical resource mapping is performed, according to an ascending order of indexes the OFDM symbols, a first part of modulation symbols of the E-PDCCH may be firstly mapped to REs used to transmit the E-PDCCH in the $n^{th}$ symbol, and then a second part of symbols may be mapped to REs used to transmit the E-PDCCH in the $(n+1)^{th}$ symbol, and so on, till a last part of modulation symbols are finally mapped to REs used to transmit the E-PDCCH in the $m^{th}$ symbol. Certainly, the embodiment of the present invention is not limited thereto; for example, another order (for example, a descending order of indexes of the OFDM symbols or other specific orders) may also be used to perform physical resource mapping.

220: The base station sends the E-PDCCH to the UE by using the REs, where the E-PDCCH and a PDSCH invoked by the E-PDCCH are frequency-division multiplexed.

For example, that the E-PDCCH and a PDSCH invoked by the E-PDCCH are frequency-division multiplexed means that an E-PDCCH and a PDSCH in LTE11 are frequency-division multiplexed on REs of data part.

In the embodiment of the present invention, the E-PDCCH can be mapped, according to the order of OFDM symbols used by the E-PDCCH of the UE, sequentially to the REs used to transmit the E-PDCCH in each OFDM symbol, so that, for candidate E-PDCCHs at a same start eCCE but different aggregation levels, different eCCEs will not include E-PDCCH modulation symbols of a same index, thereby avoiding that the UE judges a start position of the E-PDCCH incorrectly. In addition, a problem that E-PDCCHs at a same start position but different aggregation levels are mixed up is also solved.

In 210, when the E-PDCCH is mapped sequentially to the REs used to transmit the E-PDCCH in each OFDM symbol, in each OFDM symbol, the E-PDCCH may be sequentially mapped, according to an order of L eCCEs allocated to the E-PDCCH, to REs occupied by the L eCCEs in the OFDM symbol, where L is an integer.

For example, before physical resource mapping is performed, REs that can be used to transmit the E-PDCCH in a PRB pair may be firstly divided into multiple eCCEs.

Another division method is to disperse REs of each eCCE to all OFDM symbols of a data part with limitation to a part of subcarriers of the PRB pair, or disperse the REs of each eCCE to all OFDM symbols of the data part and subcarriers of the PRB pair. Under this situation, if the E-PDCCH is sequentially mapped, according to the order of L eCCEs allocated to the E-PDCCH, to REs occupied by the L eCCEs in the OFDM symbol, it can be ensured that, for candidate E-PDCCHs at a same start eCCE but different aggregation levels, different eCCEs will not have E-PDCCH modulation symbols of a same index.

In 210, when the E-PDCCH is mapped sequentially to the REs used to transmit the E-PDCCH in each OFDM symbol, in each OFDM symbol, modulation symbols of the e-PDCCH with index numbers of $$j_0 + \sum_{q=0}^{l-1} N_q + [0, \ldots, N_l - 1]$$

may be mapped, according to the order of the L eCCEs allocated to the E-PDCCH, sequentially to REs of a set $R_l$, where the set $R_l$ is a set of REs occupied by the $l^{th}$ eCCE among the L eCCEs included in the E-PDCCH, $j_0$ is a start position of the modulation symbols of the e-PDCCH mapped in the OFDM symbol, $N_l$ is the quantity of the REs in the set $R_l$, and $N_l$, $j_0$, l and q are integers.

For example, an E-PDCCH at aggregation level L may include L eCCEs, and have a modulation symbol sequence $S_j$, where j=0, ... J-1, where J is the total number of REs of the L eCCEs included in the E-PDCCH, and j is an index number of an E-PDCCH modulation symbol. According to the embodiment of the present invention, an E-PDCCH sequence $S_j$ may be mapped sequentially to the REs used to transmit the E-PDCCH in each OFDM symbol.

In 210, when the E-PDCCH is mapped sequentially to the REs used to transmit the E-PDCCH in each OFDM symbol, in each OFDM symbol, the base station maps, according to an order of subcarriers, the E-PDCCH sequentially to REs occupied by L eCCEs allocated to the E-PDCCH.

In 210, when the E-PDCCH is mapped sequentially to the REs used to transmit the E-PDCCH in each OFDM symbol, in each OFDM symbol, modulation symbols of the e-PDCCH with index numbers of $j_0+[0, \ldots, N-1]$ may be mapped sequentially to REs of a set R, where $j_0$ is a start position of modulation symbols of the E-PDCCH mapped in the OFDM symbol, the set R is a set of REs occupied by L eCCEs included in the E-PDCCH in the OFDM symbol, N is the quantity of the REs in set R, and N and $j_0$ are integers.

Embodiment 2

Figure 3:
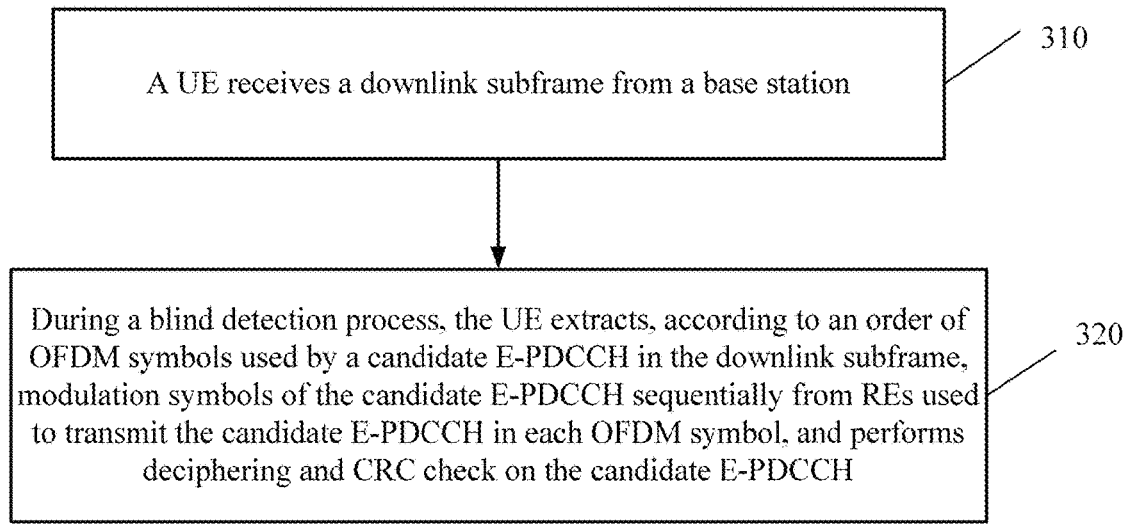
FIG. 3 is a schematic flowchart of a method for transmitting downlink control information according to Embodiment 2 of the present invention.

FIG. 3 is a schematic flowchart of a method for transmitting downlink control information according to Embodiment 2 of the present invention. The method in FIG. 3 is executed by a UE. The method in FIG. 3 corresponds to the method in FIG. 2, and detailed descriptions here are omitted appropriately.

310: The UE receives a downlink subframe from a base station.

320: The UE extracts, in a blind detection process according to an order of OFDM symbols used by a candidate E-PDCCH in the downlink subframe, modulation symbols of the candidate E-PDCCH sequentially from REs used to transmit the candidate E-PDCCH in each OFDM symbol, and performs decoding and CRC check on the candidate E-PDCCH, where the E-PDCCH of the UE and a PDSCH invoked by the E-PDCCH of the UE are frequency-division multiplexed.

In the embodiment of the present invention, modulation symbols of the candidate E-PDCCH can be obtained, according to an order of OFDM symbols used by a candidate E-PDCCH of the UE, sequentially from REs used to transmit the E-PDCCH in each OFDM symbol, so that, for candidate E-PDCCHs at a same start eCCE but different aggregation levels, different eCCEs will not include a same E-PDCCH modulation symbol, thereby avoiding a problem that the UE judges a start position of the E-PDCCH incorrectly, and solves a problem that E-PDCCHs at a same start position but different aggregation levels are mixed up.

In 320, when the UE uses, in the blind detection process, the order of OFDM symbols used by the candidate E-PDCCH, in each OFDM symbol, the UE may extract, according to an order of L eCCEs allocated to the candidate E-PDCCH, the modulation symbols of the candidate E-PDCCH sequentially from REs occupied by the L eCCEs in the OFDM symbol, where L is an integer.

In 320, when the UE uses, in the blind detection process, the order of OFDM symbols used by the candidate E-PDCCH, in each OFDM symbol, the UE may extract modulation symbols of the candidate E-PDCCH and with index numbers of $$j_0 + \sum_{q=0}^{l-1} N_q + [0, \ldots, N_l - 1]$$

from REs of a set $R_l$, where the set $R_l$ is a set of REs occupied by the $l^{th}$ eCCE among the L eCCEs included in the candidate E-PDCCH in the OFDM symbol, $j_0$ is a start position of the modulation symbols of the candidate E-PDCCH mapped in the OFDM symbol, $N_l$ is the quantity of the REs in the set $R_l$, and $N_l$, $j_0$, l and q are integers.

In 320, when the UE uses, in the blind detection process, the order of OFDM symbols used by the candidate E-PDCCH, in each OFDM symbol, the UE may extract, according to an order of subcarriers, modulation symbols of the candidate E-PDCCH from REs occupied by the L eCCEs allocated to the candidate E-PDCCH.

In 320, when the UE uses, in the blind detection process, the order of OFDM symbols used by the candidate E-PDCCH, in each OFDM symbol, the UE may extract modulation symbols of the candidate E-PDCCH and with index numbers of $j_0+[0, \ldots, N-1]$ from REs of a set R, where $j_0$ is a start position of the modulation symbols of the candidate E-PDCCH mapped in the OFDM symbol, the set R is a set of REs occupied by L eCCEs and included in the candidate E-PDCCH in the OFDM symbol, N is the quantity of the REs in the set R, and N and $j_0$ are integers.

Embodiment 3

Figure 4:
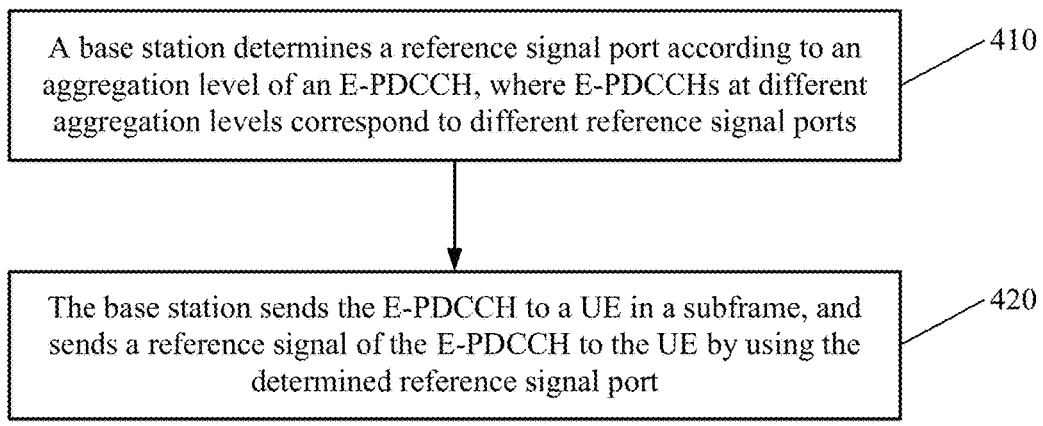
FIG. 4 is a schematic flowchart of a method for transmitting downlink control information according to Embodiment 3 of the present invention.

FIG. 4 is a schematic flowchart of a method for transmitting downlink control information according to Embodiment 3 of the present invention. The method in FIG. 4 is executed by a base station.

410: The base station determines a reference signal port according to an aggregation level of an E-PDCCH of a UE, where E-PDCCHs at different aggregation levels correspond to different reference signal ports, and the aggregation level indicates the quantity of eCCEs included in the E-PDCCH.

420: The base station sends the E-PDCCH to the UE in a subframe, and sends a reference signal of the E-PDCCH to the UE by using the determined reference signal port, where the E-PDCCH and a PDSCH invoked by the E-PDCCH are frequency-division multiplexed.

For example, the reference signal may be a DMRS, and the reference signal port may be a DMRS port. Correspondence between E-PDCCHs at different eCCE aggregation levels and DMRS ports that the E-PDCCHs use may be notified by using signaling, or may be determined by using an implicit method, which means that a signaling notification is not needed, but some parameters, such as a cell identity, a UE identity and an aggregation level and the like are used to determine the correspondence. Different PRB pairs may have same correspondence, or different correspondence may be defined for each PRB pair. The correspondence may be cell-specific; for example, the base station may notify all UEs in a cell by using broadcast signaling, which means that all the UEs in the cell run according to same correspondence. The correspondence may also be UE-specific; for example, the base station may notify a specific UE by using RRC signaling, which means that different UEs may have different correspondence.

For example, in LTE11, corresponding to candidate E-PDCCHs at aggregation levels 1, 2, 4 and 8, the reference signal is sent by sequentially using DMRS ports 7, 8, 9 and 10.

According to the embodiment of the present invention, reference signals of E-PDCCHs at different eCCE aggregation levels can be sent by using different DMRS ports, so that the UE can demodulate an E-PDCCH at each aggregation level correctly according to a special DMRS reference signal of the E-PDCCH, thereby avoiding a problem that the UE judges a start position of the E-PDCCH incorrectly, and solving a problem that E-PDCCHs at a same start position but different aggregation levels are mixed up.

According to the embodiment of the present invention, an E-PDCCH at aggregation level $L=2^{m-1}$ corresponds to a reference signal port with a port number $7+(m+\sigma)$ mod P, where m=1, 2, 3, 4, σ is 0 or a UE-specific parameter or a cell-specific parameter, and P is the quantity of available reference signal ports for the E-PDCCH, and P=4.

Optionally, that E-PDCCHs at different aggregation levels correspond to different reference signal ports may include that, E-PDCCHs at different aggregation levels, among a part or all of aggregation levels corresponding to E-PDCCHs of the UE, correspond to different reference signal ports.

Optionally, the determining, by the base station, a reference signal port according to the aggregation level of the physical downlink control channel E-PDCCH of the UE, where E-PDCCHs at different aggregation levels correspond to different reference signal ports may specifically be: selecting, by the base station according to the aggregation level of the physical downlink control channel E-PDCCH of the UE, one or more reference signal ports from a reference signal port set corresponding to the aggregation level as a reference signal port corresponding to the aggregation level, where reference signal ports selected for E-PDCCHs at different aggregation levels are different.

According to the embodiment of the present invention, in 410, it is acceptable that only E-PDCCHs at a same start position in the subframe but different aggregation levels correspond to different reference signal ports. In other words, without depending on the aggregation level, E-PDCCHs with different start positions may correspond to a same reference signal port.

Optionally, as another embodiment, the method in FIG. 4 further includes: configuring, by the base station, correspondence between eCCEs in the subframe and the reference signal ports, so that, according to the correspondence between eCCEs in the subframe and the reference signal ports, enabling E-PDCCHs at a same start position but different aggregation levels in the subframe correspond to different reference signal ports.

Further, the at a same start position in the subframe may include: at a same start position in a same physical resource block pair or different physical resource block pairs.

Further, E-PDCCHs, corresponding to different user equipments UEs, at a same aggregation level, and occupying a same physical resource, correspond to different reference signal ports.

The correspondence between eCCEs in the subframe and the reference signal ports includes: the $i^{th}$ eCCE in the subframe corresponds to a reference signal port $7+(i+\sigma)$ mod P, where i is an index of the eCCE in the subframe, σ is 0 or a UE-specific parameter or a cell-specific parameter, and P is the quantity of available reference signal ports, and P=4, and i is an integer; in 410, the base station sends a reference signal of the E-PDCCH at aggregation level $L=2^{m-1}$ by using a reference signal port corresponding to the $m^{th}$ eCCE in the E-PDCCH at aggregation level $L=2^{m-1}$, where m=1, 2, 3, 4.

Embodiment 4

Figure 5:
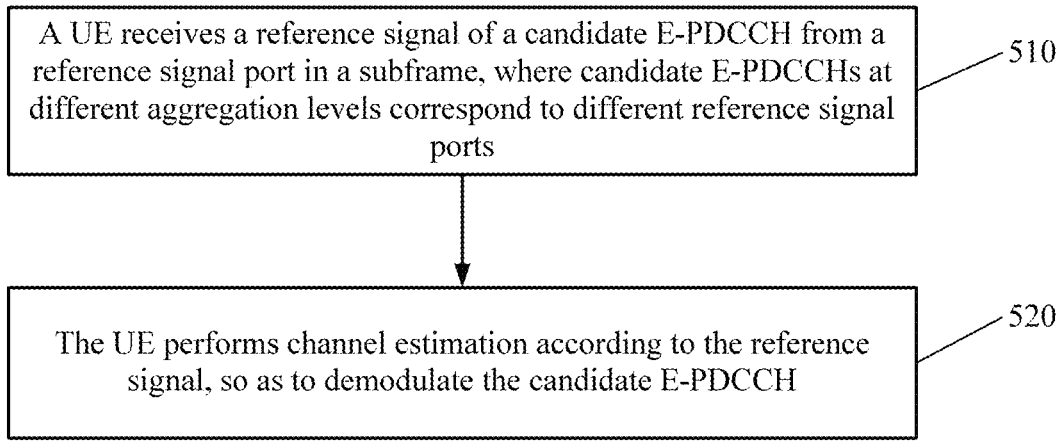
FIG. 5 is a schematic flowchart of a method for transmitting downlink control information according to Embodiment 4 of the present invention.

FIG. 5 is a schematic flowchart of a method for transmitting downlink control information according to Embodiment 4 of the present invention. The method in FIG. 5 is executed by a UE. The method in FIG. 5 corresponds to the method in FIG. 4, and detailed descriptions here are omitted appropriately.

510: The UE receives a reference signal of a candidate E-PDCCH from a reference signal port in a subframe, where candidate E-PDCCHs at different aggregation levels correspond to different reference signal ports, and the aggregation level indicates the quantity of eCCEs included in the candidate E-PDCCH.

The UE receives, from a reference signal port in a subframe, a reference signal of a candidate physical downlink control channel E-PDCCH sent by a base station, where candidate E-PDCCHs at different aggregation levels correspond to different reference signal ports, and the aggregation level indicates the quantity of control channel elements included in the candidate E-PDCCH.

520: The UE performs channel estimation according to the reference signal, so as to demodulate the candidate E-PDCCH.

Further, optionally, the E-PDCCH of the UE and a PDSCH invoked by the E-PDCCH of the UE are frequency-division multiplexed.

The UE performs channel estimation according to the reference signal, so as to demodulate the candidate E-PDCCH, where the candidate E-PDCCH and a physical downlink shared channel PDSCH invoked by the candidate E-PDCCH are frequency-division multiplexed.

For example, assuming that the base station sends an E-PDCCH at aggregation level 2 and sends a reference signal by using DMRS port 8, when blindly detecting each candidate E-PDCCH at aggregation level 1, the UE tries to perform channel estimation based on DMRS port 7 and demodulate the E-PDCCH; however, in fact, the base station does not send the reference signal to the UE by using DMRS port 7; it is quite clear that the demodulated output is some random noise, so that CRC check is not possible to be successful, thereby avoiding that the UE mixes up candidate E-PDCCHs at different aggregation levels.

According to the embodiment of the present invention, reference signals of E-PDCCHs at different eCCE aggregation levels can be sent by using different DMRS ports, thereby avoiding a problem that the UE judges a start position of the E-PDCCH incorrectly, and solving a problem that E-PDCCHs at a same start position but different aggregation levels are mixed up.

According to the embodiment of the present invention, an E-PDCCH at aggregation level $L=2^{m-1}$ corresponds to a reference signal port with a port number $7+(m+\sigma)$ mod P, where m=1, 2, 3, 4, σ is 0 or a UE-specific parameter or a cell-specific parameter, and P is the quantity of available reference signal ports for the E-PDCCH, and P=4.

Optionally, as another embodiment, in 510, it is acceptable that only E-PDCCHs at a same start position but different aggregation levels correspond to different reference signal ports. In other words, without depending on the aggregation level, E-PDCCHs with different start positions may correspond to a same reference signal port.

The method in FIG. 5 further includes: configuring, by the UE, correspondence between eCCEs in the subframe and the reference signal ports, so that, according to the correspondence between eCCEs in the subframe and the reference signal ports, enabling E-PDCCHs at a same start position but different aggregation levels in the subframe correspond to different reference signal ports.

The correspondence between the eCCEs in the subframe and the different reference signal ports includes: the $i^{th}$ eCCE in the subframe corresponds to a reference signal port $7+(i+\sigma)$ mod P, where i is an index of the eCCE in the subframe, σ is 0 or a UE-specific parameter or a cell-specific parameter, and P is the quantity of available reference signal ports, and P=4, and i is an integer; in 510, the UE may receive a reference signal of an E-PDCCH at aggregation level $L=2^{m-1}$ from a reference signal port corresponding to the $m^{th}$ eCCE in the E-PDCCH at aggregation level $L=2^{m-1}$, where m=1, 2, 3, 4.

Optionally, that candidate E-PDCCHs at different aggregation levels correspond to different reference signal ports may specifically be: selecting, by the UE, according to the aggregation level of the candidate E-PDCCH of the UE, one or more reference signal ports from a reference signal port set corresponding to the aggregation level as a reference signal port corresponding to the aggregation level, where candidate E-PDCCHs at different aggregation levels correspond to different reference signal ports.

Further, that candidate E-PDCCHs at different aggregation levels correspond to different reference signal ports may include: that candidate E-PDCCHs at a same start position but different aggregation levels in the subframe correspond to different reference signal ports.

Optionally, that candidate E-PDCCHs at different aggregation levels correspond to different reference signal ports may include:

that candidate E-PDCCHs at different aggregation levels, among a part or all of aggregation levels corresponding to candidate E-PDCCHs of the UE, correspond to different reference signal ports.

Embodiment 5

Figure 6:
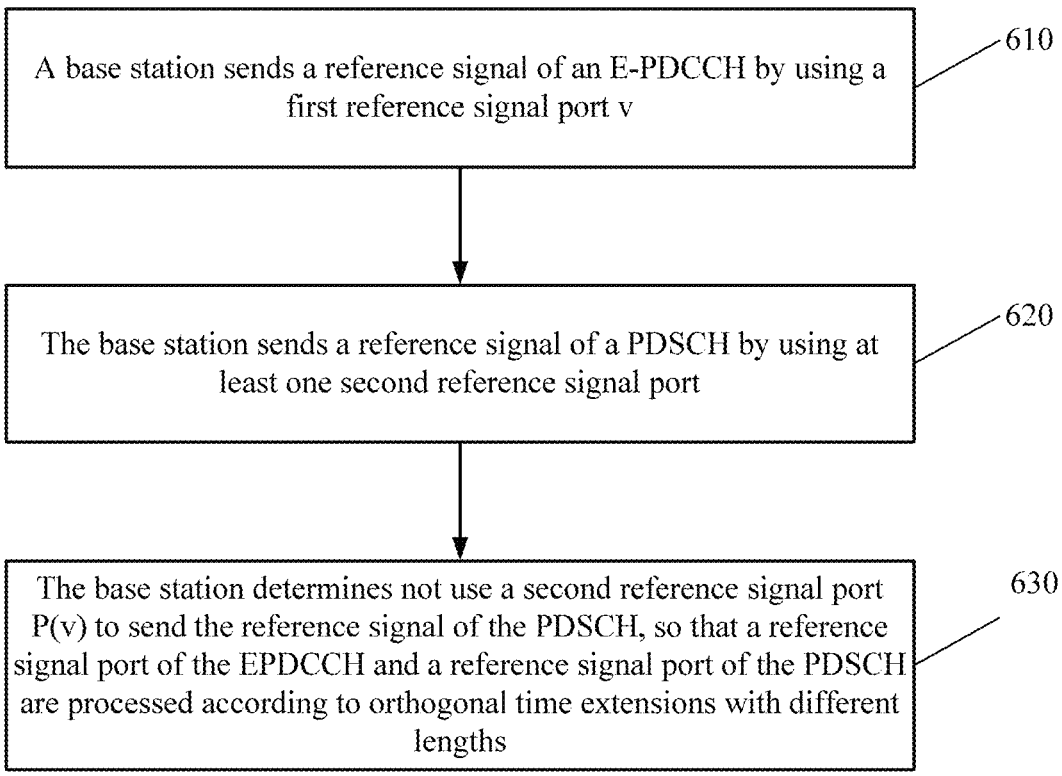
FIG. 6 is a schematic flowchart of a method for transmitting downlink control information according to Embodiment 5 of the present invention.

FIG. 6 is a schematic flowchart of a method for transmitting downlink control information according to Embodiment 5 of the present invention. The method in FIG. 6 is executed by a base station.

610: The base station sends a reference signal of the E-PDCCH by using a first reference signal port v.

620: The base station sends a reference signal of the PDSCH by using at least one second reference signal port.

630: The base station determines not to use a second reference signal port p(v) to send the reference signal of the PDSCH, so that a reference signal port of the E-PDCCH and a reference signal port of the PDSCH are processed based on orthogonal time extensions with different lengths, where the E-PDCCH and the PDSCH are frequency-division multiplexed, the first reference signal port may be one of the at least one second reference signal port, and v and p(v) are serial numbers of the reference signal ports.

For example, LTE release 11 supports multiplexing of an E-PDCCH and a PDSCH; in order that a DMRS port with respect to an E-PDCCH is processed based on an orthogonal time extension with a length of 2, and also that. when a PDSCH with a rank of 5, 6 or 7 is scheduled by the E-PDCCH, a DMRS port with respect to a PDSCH is processed based on an orthogonal time extension with a length of 4, the present invention proposes the following limitation on the DMRS ports for the PDSCH; that is to say, when a DMRS port occupied by the E-PDCCH of the UE is v, a DMRS port p(v) is defined not to be used to demodulate the PDSCH, or, another DMRS port is needed to replace the p(v), so that a reference signal port of the E-PDCCH and a reference signal port of the PDSCH are processed based on orthogonal time extensions with different lengths, and that the E-PDCCH and the PDSCH can be multiplexed normally.

According to the embodiment of the present invention, when sending the reference signal of the PDSCH by using a reference signal port results that the reference signal ports of the E-PDCCH and the PDSCH cannot be processed based on orthogonal time extensions with different lengths, the reference signal port may be not used to send the reference signal of the PDSCH, so that the reference signal of the PDSCH and the reference signal of the E-PDCCH are multiplexed normally.

According to the embodiment of the present invention, the at least one second reference signal port includes at least one of PDSCH reference signal ports 7, 8, 9, 10, 11, 12, 13 and 14 defined in LTE release 10, the first reference signal port includes an E-PDCCH reference signal port 7, 8, 9, or 10 defined in LTE release 10, and $$p(v) = \begin{cases} 11, v = 7 \\ 13, v = 8 \\ 12, v = 9 \\ 14, v = 10 \end{cases}.$$

In 620, when a rank R of the PDSCH is less than or equal to 4, the base station may send the reference signal of the PDSCH by using a PDSCH reference signal port defined in LTE release 10.

Optionally, as another embodiment, when the rank of the PDSCH is one of 5, 6 and 7, the base station sends the reference signal of the PDSCH by using a PDSCH reference signal port defined in LTE release 10, and when needing to send the reference signal of the PDSCH by using the second reference signal port p(v), replaces the reference signal port p(v) with another available reference signal port among the PDSCH reference signal ports, where R is an integer.

According to the embodiment of the present invention, when a rank R of the PDSCH is less than or equal to 4, the base station sends the reference signal of the PDSCH by using R reference signal ports 7+(v−7+r) mod 4 starting from the reference signal port v, where r=0, . . . , R−1, and R is an integer.

Optionally, as another embodiment, when the rank R of the PDSCH is equal to one of 5, 6 and 7, the base station sends the reference signal of the PDSCH by using R reference signal ports 7+(v−7+r) mod 8 starting from the reference signal port v, and when the R reference signal ports include the reference signal port p(v), replaces the reference signal port p(v) with another reference signal port among the PDSCH reference signal ports, where r=0, . . . , R−1.

Optionally, as another embodiment, when a rank R of the PDSCH is equal to 3 or 4, the base station may send the reference signal of the PDSCH by using R reference signal ports 7+(v−7+r) mod 4 starting from the reference signal port v, where R is an integer, r=0, . . . , R−1; and when the rank R of the PDSCH is equal to 2, the base station sends the send the reference signal of the PDSCH by using reference signal ports v and v+(−1)$^{(v-7) mod 2}$.

Embodiment 6

Figure 7:
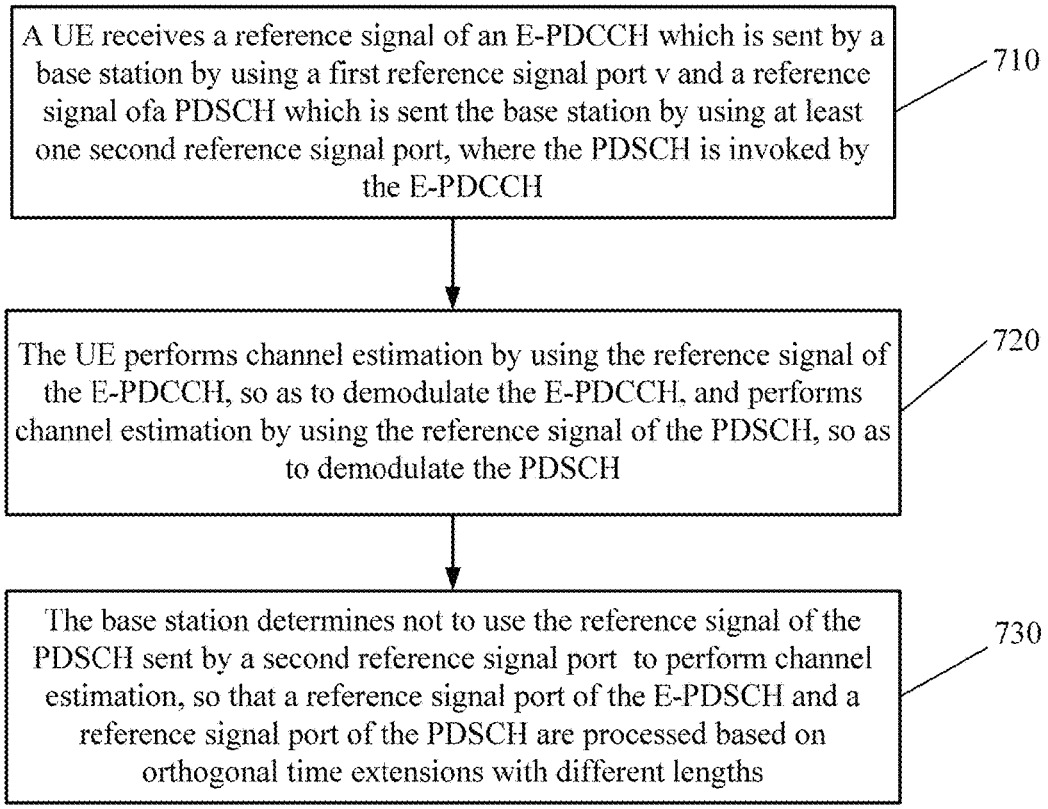
FIG. 7 is a schematic flowchart of a method for transmitting downlink control information according to Embodiment 6 of the present invention.

FIG. 7 is a schematic flowchart of a method for transmitting downlink control information according to Embodiment 6 of the present invention. The method in FIG. 7 is executed by a UE. The method in FIG. 7 corresponds to the method in FIG. 6, and detailed descriptions here are omitted appropriately.

710: The UE receives a reference signal of an E-PDCCH which is sent by a base station by using a first reference signal port v and a reference signal of a PDSCH which is sent by the base station by using at least one second reference signal port, where the PDSCH is invoked by the E-PDCCH.

720: The UE performs channel estimation by using the reference signal of the E-PDCCH, so as to demodulate the E-PDCCH, and performs channel estimation by using the reference signal of the PDSCH, so as to demodulate the PDSCH.

730: The base station determines not to use the reference signal of the PDSCH sent by a second reference signal port p(v) to perform channel estimation, so that a reference signal port of the E-PDCCH and a reference signal port of the PDSCH are processed based on orthogonal time extensions with different lengths, where the E-PDCCH and the PDSCH are frequency-division multiplexed, the first reference signal port may be one of the at least one second reference signal port, and V and p(v) are serial numbers of the reference signal ports.

According to the embodiment of the present invention, when sending the reference signal of the PDSCH by using a reference signal port results that the reference signal ports of the E-PDCCH and the PDSCH cannot be processed according to orthogonal time extensions with different lengths, the reference signal port may be not used to send the reference signal of the PDSCH, so that the reference signal of the PDSCH and the reference signal of the E-PDCCH are multiplexed normally.

According to the embodiment of the present invention, the at least one second reference signal port includes at least one of PDSCH reference signal ports 7, 8, 9, 10, 11, 12, 13 and 14 defined in LTE release 10; that is to say, the second reference signal port includes the PDSCH reference signal ports 7, 8, 9, 10, 11, 12, 13 or 14 defined in LTE release 10, the first reference signal port includes an E-PDCCH reference signal port 7, 8, 9, or 10 defined in LTE release 10, and $$p(v) = \begin{cases} 11, v = 7 \\ 13, v = 8 \\ 12, v = 9 \\ 14, v = 10 \end{cases}.$$

According to the embodiment of the present invention, when a rank R of the PDSCH is less than or equal to 4, the UE performs channel estimation by using a reference signal of the PDSCH sent by a PDSCH reference signal port defined in LTE release 10.

According to the embodiment of the present invention, when the rank R of the PDSCH is one of 5, 6 and 7, the UE may perform channel estimation by using a reference signal of the PDSCH sent by a PDSCH reference signal port defined in LTE release 10, and when needing to perform channel estimation by using the reference signal of the PDSCH sent by the second reference signal port p(v), replaces the reference signal port p(v) with another available reference signal port among the PDSCH reference signal ports to perform channel estimation.

Optionally, as another embodiment, when a rank R of the PDSCH is less than or equal to 4, the UE performs channel estimation by using reference signals of the PDSCH sent by R reference signal ports 7 +(v−7+r) mod 4 starting from the reference signal port v, where r=0, . . . , R−1, and R is an integer; or, when the rank R of the PDSCH is equal to one of 5, 6 and 7, the UE performs channel estimation by using reference signals of the PDSCH sent by R reference signal ports 7+(v−7+r) mod 8 starting from the reference signal port v, and when the R reference signal ports include the reference signal port p(v), replaces the reference signal port p(v) with another reference signal port among the PDSCH reference signal ports to perform channel estimation, where r=0, . . . , R−1.

According to the embodiment of the present invention, when a rank R of the PDSCH is equal to 3 or 4, the UE performs channel estimation by using reference signals of the PDSCH sent by R reference signal ports 7+(v−7+r) mod 4 starting from the reference signal port v, where r=0, . . . , R−1; and when the rank of the PDSCH is equal to 2, the UE performs channel estimation by using reference signals of the PDSCH sent by reference signal ports v and v+(−1)$^{(v-7) mod 2}$.

With reference to a specific example, the following describes the embodiments of the present invention in more detail.

Embodiment 7

Figure 8A:
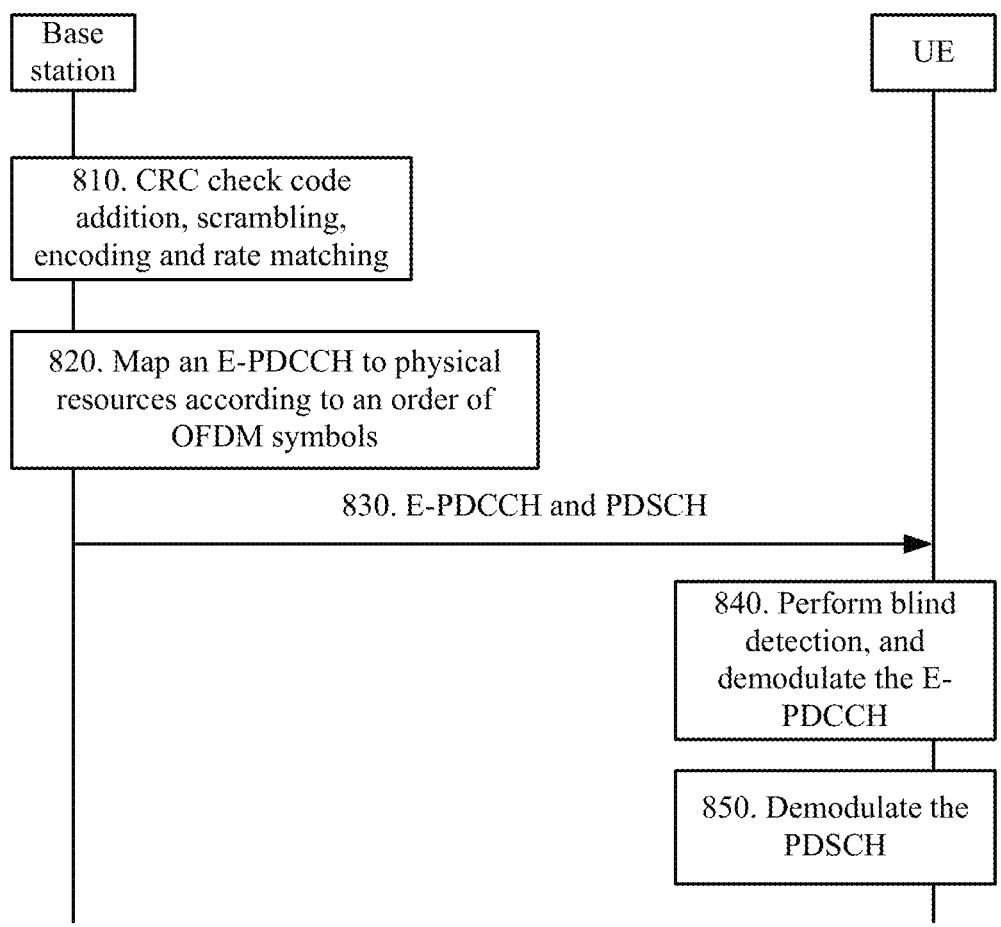
FIG. 8A is a schematic flowchart of a process for transmitting downlink control information according to Embodiment 7 of the present invention.
Figure 8B:
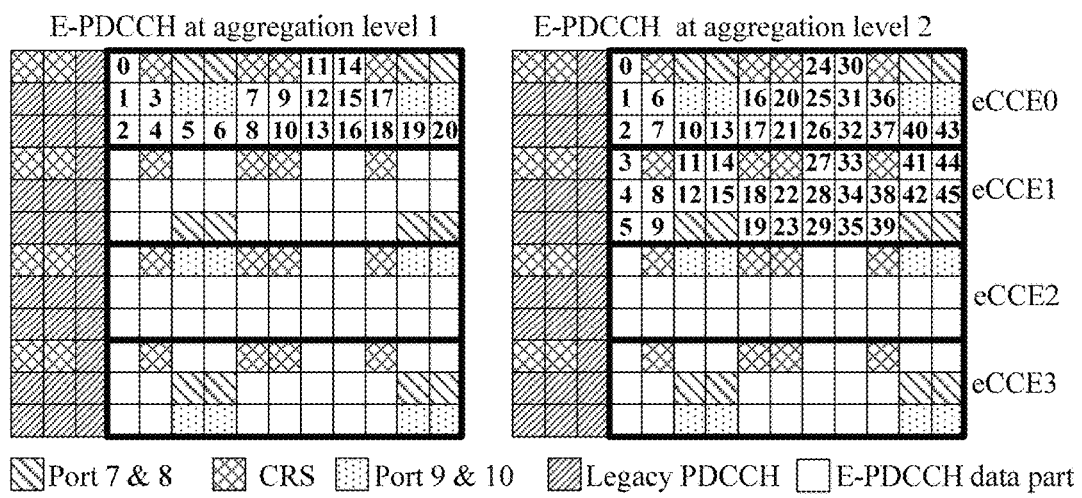
FIG. 8B is a schematic diagram showing physical resource mapping on a PDCCH according to an embodiment of the present invention.

FIG. 8A is a schematic flowchart of a process for transmitting downlink control information according to Embodiment 7 of the present invention. FIG. 8B is a schematic diagram showing physical resource mapping on a PDCCH according to an embodiment of the present invention. Embodiment 7 elaborates one or more steps of the methods in Embodiment 1 and Embodiment 2.

810: A base station performs CRC check code addition, scrambling, encoding and rate matching on downlink control information of a UE, so as to obtain modulation symbols of a PDCCH.

For example, scrambling may be performed on the downlink control information of the UE by using 16-bit cyclic redundancy check (CRC) and a radio network temporary identity (RNTI), and encoding and rate matching is performed on the downlink control information of the UE by using convolutional encoding with master code being 1/3 and a circular buffering based rate, so as to obtain modulation symbols of a PDCCH.

820: The base station maps, according to an order of OFDM symbols used by a PDCCH, the PDCCH sequentially to REs used to transmit the E-PDCCH in each OFDM symbol.

Before physical resource mapping is performed, REs that can be used to transmit the E-PDCCH in a PRB pair may be divided into several eCCEs. Here, a specific eCCE division method is not limited.

Specifically, for a localized E-PDCCH, a simple eCCE division method is to limit an eCCE to a part of subcarriers, for example, a division method in FIG. 1. Another method is to disperse REs of each eCCE to all subcarriers and all OFDM symbols of a data part of the PRB pair, for example, assuming that the quantity of REs available for the E-PDCCH in the PRB pair is N, and the REs are divided into K eCCEs. Particularly, the K eCCEs may have an equal size, that is, $\lfloor N/K \rfloor$; under this situation, the quantity of REs that are not used is N mod K. In order to fully utilize all REs, and ensure that sizes of eCCEs divided in a PRB pair are as close as possible, a simple method is to allocate a size of $\lceil N/K \rceil$ to the first N mod K eCCEs, and allocate a size of $\lfloor N/K \rfloor$ to other eCCEs. However, this method may cause uneven sizes of candidate E-PDCCHs at aggregation level 2; for example, assuming that K is equal to 4, and N mod K=2, and assuming that the first two eCCEs form a candidate E-PDCCH at aggregation level 2, while the last two eCCEs form another candidate E-PDCCH at aggregation level 2, a difference in the numbers of REs between the two candidate E-PDCCHs is 2, but in fact, the two candidate E-PDCCHs may possibly have an equal number of REs. Therefore, another method to allocate eCCE sizes is to map eCCEs with a size of $\lceil N/K \rceil$ in the PRB pair to discontinuous eCCE indexes, for example, to define a size of an eCCE with an index of $\lfloor k \cdot K/(N \bmod K) \rfloor$ as $\lceil N/K \rceil$, where k=0, ..., N mod K−1, and define a size of other eCCEs as $\lfloor N/K \rfloor$.

Similarly, for a distributed E-PDCCH, assuming that a total number of available REs in a PRB pair of the distributed E-PDCCH is N, and the REs are divided into K eCCEs. Particularly, the K eCCEs may have an equal size, that is, $\lfloor N/K \rfloor$; under this situation, the quantity of REs that are not used is N mod K. In order to fully utilize all REs, and ensure that sizes of eCCEs divided in a PRB pair are as close as possible, a simple method is to allocate a size of $\lceil N/K \rceil$ to the first N mod K eCCEs, and allocate a size of $\lfloor N/K \rfloor$ to other eCCEs. Optionally, as another embodiment, eCCEs with a size of $\lceil N/K \rceil$ may be mapped to discontinuous eCCE indexes, for example, to define a size of an eCCE with an index of $\lfloor k \cdot K/(N \bmod K) \rfloor$ as $\lceil N/K \rceil$, where k=0, ..., N mod K−1, and define a size of another eCCE as $\lfloor N/K \rfloor$.

According to the embodiment of the present invention, an E-PDCCH at aggregation level L may include L eCCEs, and have a modulation symbol sequence $S_j$, where j=0, ... J−1, where J is a total number of REs of the L eCCEs included in the E-PDCCH. The base station performs physical resource mapping on each E-PDCCH. The base station may, according to a frequency priority method, firstly map the E-PDCCH to REs occupied by L eCCEs allocated to the E-PDCCH on an OFDM symbol of the E-PDCCH, and then map the E-PDCCH to REs occupied by the L eCCEs allocated to the E-PDCCH on a next OFDM symbol of the E-PDCCH.

Specifically, in an OFDM symbol, the E-PDCCH may be firstly mapped to REs occupied by an eCCE among the L eCCEs included in the E-PDCCH, and then mapped to REs occupied by a next eCCE. Assuming that in an OFDM symbol, a RE set occupied by the $l^{th}$ eCCE among the L eCCEs included in the E-PDCCH is $R_l$, and the quantity of REs included in the set is $N_l$, modulation symbols of the e-PDCCH with an index j within a range $$j_0 + \sum_{q=0}^{l-1} N_q + [0, \ldots, N_l - 1]$$

are mapped sequentially to the REs of the set $R_l$ according to an order of eCCEs, where $j_0$ is a start position of the modulation symbols of the E-PDCCH mapped in the OFDM symbol.

Optionally, as another embodiment, in an OFDM symbol, for REs of L eCCEs allocated to the E-PDCCH, eCCEs are not differentiated and mapping is performed according to an order of subcarriers. Assuming that, in an OFDM symbol, a RE set occupied by L eCCEs included in an E-PDCCH is R, and a total number of REs included in the set is N, modulation symbols of the e-PDCCH with an index j within a range $j_0$+[0, ..., N−1] are mapped sequentially to the REs of the set R, where $j_0$ is a start position of the modulation symbols of the E-PDCCH mapped in the OFDM symbol.

Referring to FIG. 8B, FIG. 8B shows physical resource mapping of an E-PDCCH at aggregation level 1 and physical resource mapping of an E-PDCCH at aggregation level 2. It can be seen from FIG. 8B that, a modulation symbol of an E-PDCCH at aggregation level 2 mapped in eCCE0 is almost completely different with a modulation symbol of an E-PDCCH at aggregation level 1 mapped in eCCE0 or eCCE1.

830: The base station sends the E-PDCCH to the UE by using a RE, and sends the PDSCH scheduled by the E-PDCCH to the UE.

840: After receiving a downlink subframe from the base station, the UE extracts, in a blind detection process according to an order of OFDM symbols used by a candidate E-PDCCH, modulation symbols of the candidate E-PDCCH sequentially from REs used to transmit the candidate E-PDCCH in each OFDM symbol.

For a PDSCH and an E-PDCCH transmitted in a subframe, the UE firstly needs to blindly detect the E-PDCCH, that is, to detect, from all candidate E-PDCCHs in a search space of the UE, the E-PDCCH that the base station sends to the UE. For example, the UE performs channel estimation based on a reference signal part, and performs demodulation, decoding and CRC check and like operations on a data symbol part, so as to obtain downlink control information (DCI) of the UE transmitted on the E-PDCCH.

Referring to FIG. 8B again, assuming that the base station actually sends an E-PDCCH at aggregation level 2 by using eCCE0 and eCCE1, it is impossible that the UE detect an E-PDCCH at aggregation level 1 on eCCE0 and eCCE1. Therefore, according to the method in the embodiment of the present invention, the foregoing problem that a start position of the E-PDCCH is judged incorrectly and the problem that E-PDCCHs at a same start position but different aggregation levels are mixed up are both solved.

850: If detecting its own E-PDCCH, the UE demodulates a corresponding PDSCH according to the downlink control information in the E-PDCCH, and feeds back in the uplink according to whether the PDSCH demodulation is correct.

For example, if the PDSCH is demodulated correctly, the UE feeds back an acknowledgement (ACK) message to the eNodeB, indicating that the UE has already correctly received data sent by the eNodeB, and the eNodeB may transmit new data. Otherwise, the UE feeds back a negative-acknowledgement (NACK) message to the eNodeB, indicating that the data has not been received correctly, and the eNodeB needs to retransmit the data. Another situation is that the E-PDCCH has not been detected correctly, so that the UE assumes that no data is scheduled to the UE, and does not feed back anything in an uplink, which means discontinuous transmission (DTX).

Embodiment 8

Figures 9A, 9B:
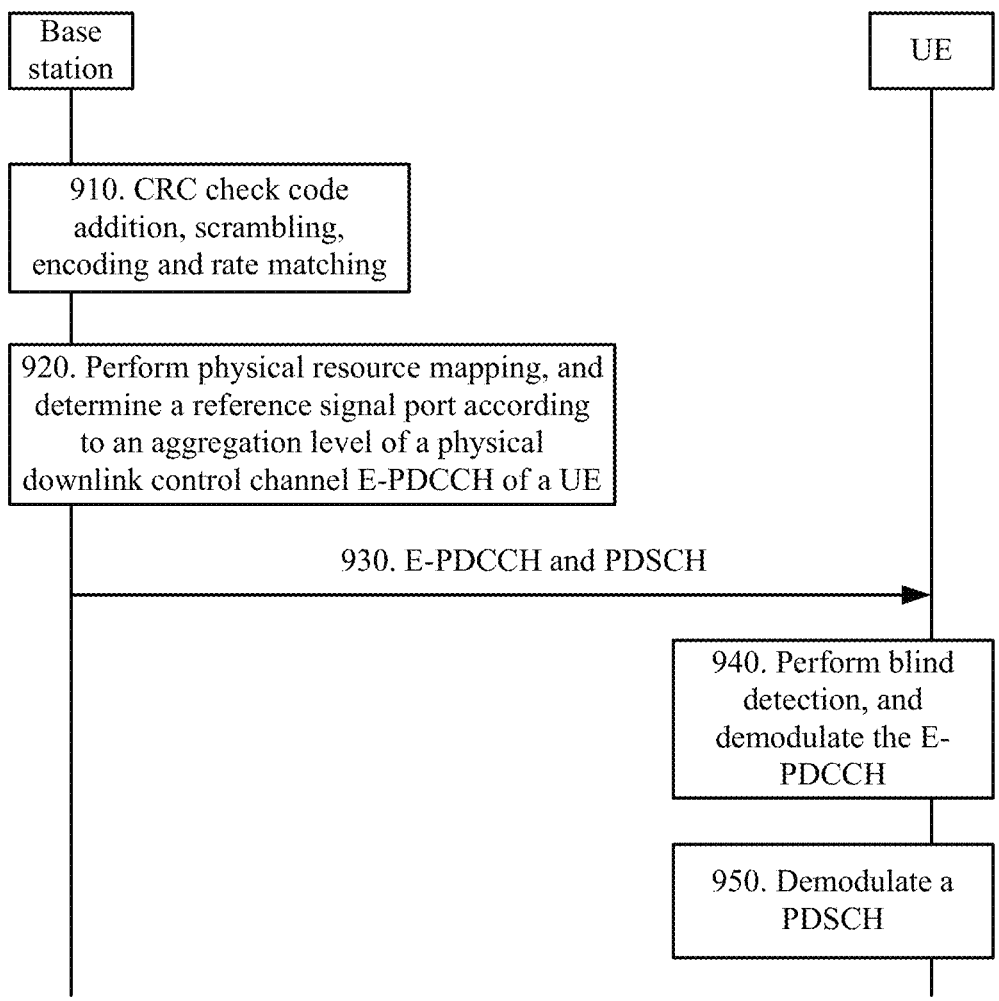
FIG. 9A is a schematic flowchart of a process for transmitting downlink control information according to Embodiment 8 of the present invention.
FIG. 9B and FIG. 9C are examples of allocating a DMRS port to a candidate E-PDCCH.

FIG. 9A is a schematic flowchart of a process for transmitting downlink control information according to Embodiment 8 of the present invention. Embodiment 8 elaborates one or more steps of the methods in Embodiment 3 and Embodiment 4.

According to the embodiment of the present invention, a localized E-PDCCH is used as an example for description. As a reference signal of an E-PDCCH is dedicated to one UE, a reference signal port (that is a DMRS port) and eCCEs occupied by the E-PDCCH both need to be defined in a design of an E-PDCCH search space. According to the embodiment of the present invention, reference signals of E-PDCCHs at different eCCE aggregation levels can be sent by using different DMRS ports, so as to prevent the UE from mixing up the E-PDCCHs at different eCCE aggregation levels.

910: A base station performs CRC check code addition, scrambling, encoding and rate matching on downlink control information of a UE, so as to obtain modulation symbols of a PDCCH. 910 in FIG. 9 is similar to 810 in FIG. 8, and is not described here any further.

920: The base station maps an E-PDCCH to a physical source, and determines a reference signal port according to an aggregation level of the E-PDCCH of the UE, where E-PDCCHs at different aggregation levels correspond to different reference signal ports.

Correspondence between E-PDCCHs at different eCCE aggregation levels and DMRS ports that the E-PDCCHs use may be notified by using signaling, or may be determined by using an implicit method, which means that a signaling notification is not needed, but some parameters, such as a cell identity, a UE identity and an aggregation level and the like are used to determine the correspondence. Different PRB pairs may have same correspondence, or different correspondence may be defined for each PRB pair. The correspondence may be cell-specific; for example, the base station may notify all UEs in a cell by using broadcast signaling, which means that all the UEs in the cell run according to same correspondence. The correspondence may also be UE-specific; for example, the base station may notify a specific UE by using RRC signaling, which means that different UEs may have different correspondence.

For example, the quantity of DMRS ports available for an E-PDCCH is P; in LTE release 11, P may be equal to 4; that is to say, DMRS ports 7, 8, 9 and 10 may be used as E-PDCCH reference signal ports. Therefore, for a UE, a DMRS port used by a candidate E-PDCCH at aggregation level $L=2^m$ may be defined as $7+(m+\sigma) \mod P$, where $\sigma$ is a fixed value, for example, $\sigma$ is equal to 0; or $\sigma$ is a cell-specific parameter; or $\sigma$ is a specific parameter for each transmission point in a cell in coordinated multi-point transmission; or $\sigma$ is a UE-specific parameter. For example, for a UE, corresponding to candidate E-PDCCHs at aggregation levels 1, 2, 4 and 8, the reference signal is sent sequentially by using DMRS ports 7, 8, 9 and 10.

Optionally, as another embodiment, assuming that a problem that a start position of an E-PDCCH is judged incorrectly has already been solved by using another method, for example, by using a method of adding a filling bit in LTE release 8, only a problem needs to be solved that E-PDCCHs at a same start position but different aggregation levels is mixed. Here, it is only necessary to allocate different DMRS ports to candidate E-PDCCHs at a same start eCCE but different aggregation levels to send reference signals; that is to say, for candidate E-PDCCHs with different start eCCEs, a same DMRS port may be allocated to send reference signals. Assuming that correspondence between each eCCE and a DMRS port is defined by using a method, the correspondence may be notified by using signaling, but with a high overhead; or the correspondence may be determined by using an implicit method, which means that no signaling notification is needed, but some parameters (such as a cell identity, a UE identity and an aggregation level and the like) are used to determine the correspondence. Different PRB pairs may have same correspondence, or different correspondence may be defined for each PRB pair. The correspondence may be cell-specific; for example, the base station may notify all UEs in a cell by using broadcast signaling, which means that all the UEs in the cell run according to same correspondence. The correspondence may also be UE-specific; for example, the base station may notify a specific UE by using RRC signaling, which means that different UEs may have different correspondence.

According to the embodiment of the present invention, in order to allocate different DMRS ports to candidate E-PDCCHs at a same start position but different aggregation levels, eCCEs may be sorted firstly; for example, eCCEs in a PRB pair may be numbered firstly, and eCCEs in a next PRB pair may be numbered subsequently; that is to say, an eCCE with an index i corresponds to the $(i \mod K)^{th}$ eCCE in the $\lfloor i/K \rfloor^{th}$ E-PDCCH PRB pair, where K is the quantity of eCCEs divided in each PRB pair. The embodiment of the present invention is not limited to this numbering method.

Then, based on the eCCE numbering, a DMRS port corresponding to each eCCE is defined sequentially; for example, when the quantity of available DMRS ports is P, eCCEs may be defined to use reference signals at the P DMRS ports sequentially and circularly. In LTE release 11, P is equal to 4; that is to say, DMRS ports 7, 8, 9 and 10 may be used as E-PDCCH reference signal ports. Therefore, for a UE, a DMRS port corresponding to the $i^{th}$ eCCE may be defined as $7+(i+\sigma) \mod P$, where $\sigma$ is a fixed value, for example, 0; optionally, $\sigma$ is a cell-specific parameter; optionally, $\sigma$ is a specific parameter specific to each transmission point in a cell in coordinated multi-point transmission; and optionally, $\sigma$ is a UE-specific parameter.

Finally, based on the correspondence between eCCEs and DMRS ports, a DMRS port that an E-PDCCH at each aggregation level uses is defined, and it is ensured that candidate E-PDCCHs at a same start position but different aggregation levels use different DMRS ports. For example, when the aggregation level is $L=2^{m-1}$ (m=1, 2, 3, 4), each candidate E-PDCCH may be defined to use a DMRS port mapped to the $m^{th}$ eCCE to send a reference signal.

Figures 9C, 10:
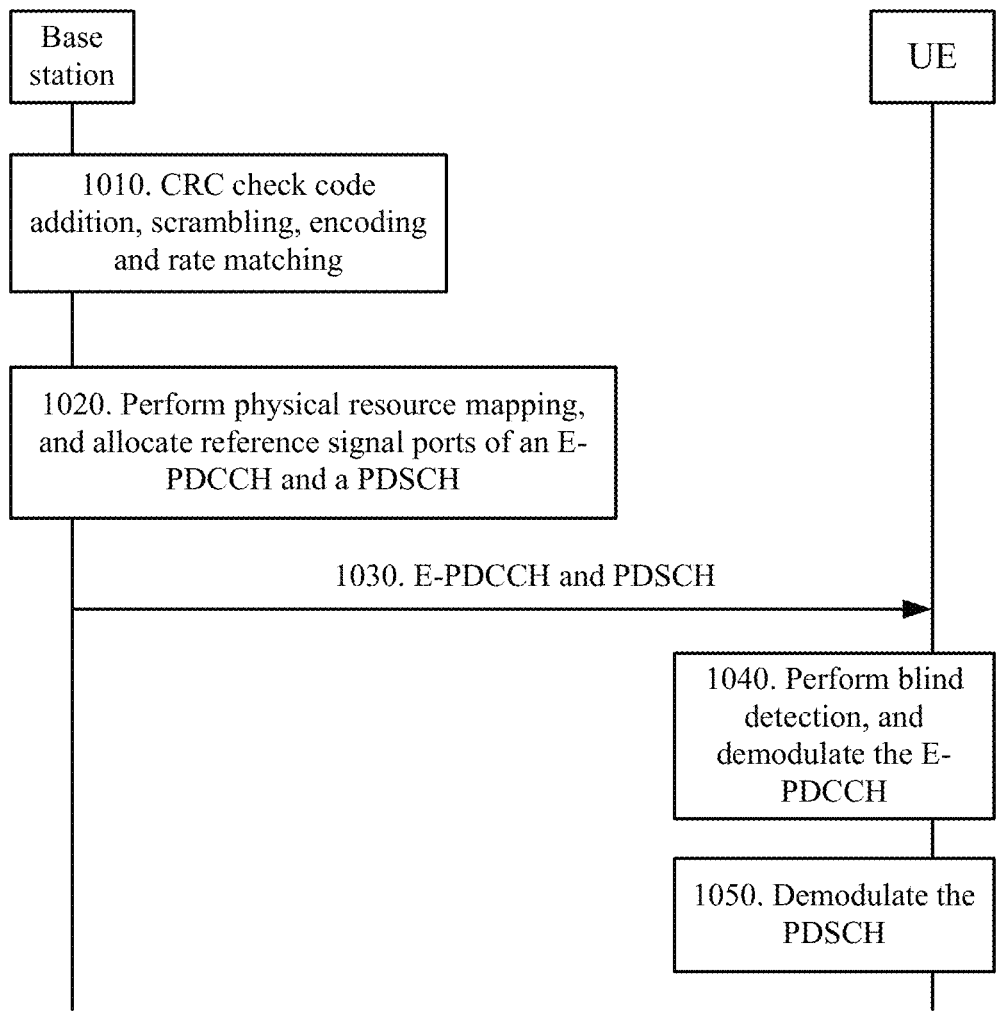
FIG. 10 is a schematic flowchart of a process for transmitting downlink control information according to Embodiment 9 of the present invention.

FIG. 9B and FIG. 9C are examples of allocating a DMRS port to a candidate E-PDCCH.

Referring to FIG. 9B, assuming that one RBG includes two PRB pairs, and each PRB pair is divided into 4 eCCEs, according to the foregoing method, for a UE, eCCEs use DMRS ports 7, 8, 9 and 10 sequentially and circularly. For aggregation level 1, a DMRS port mapped to an eCCE included in a candidate E-PDCCH is used; for aggregation level 2, a DMRS port mapped to a second eCCE included in a candidate E-PDCCH is used, which means that DMRS ports 8 and 10 may be used; for aggregation level 4, a DMRS port mapped to a third eCCE included in a candidate E-PDCCH is used, which means port 9 is always used; and for aggregation level 8, a DMRS port mapped to a fourth eCCE included in a candidate E-PDCCH is used, which means port 10 is always used. When a candidate E-PDCCH crosses more than one PRB pair, a DMRS port determined according to the foregoing method is also configured to bear a reference signal on multiple PRB pairs mapped to the candidate E-PDCCH, for example, when the aggregation level is 8.

Referring to FIG. 9C, assuming that one RBG includes three PRB pairs, and each PRB pair is divided into 3 eCCEs, according to the foregoing method, for a UE, it is still assumed that eCCEs use DMRS ports 7, 8, 9 and 10 sequentially and circularly. For aggregation level 1, a DMRS port mapped to an eCCE included in a candidate E-PDCCH is used; for aggregation level 2, a DMRS port mapped to a second eCCE included in a candidate E-PDCCH is used, which means that DMRS ports 8 and 10 may be used; for aggregation level 4, a DMRS port mapped to a third eCCE included in a candidate E-PDCCH is used, which means port 9 is always used; and for aggregation level 8, a DMRS port mapped to a fourth eCCE included in a candidate E-PDCCH is used, which means port 10 is always used. When a candidate E-PDCCH crosses more than one PRB pair, a DMRS port determined according to the foregoing method is further configured to bear a reference signal on multiple PRB pairs mapped to the candidate E-PDCCH, for example, when the aggregation level is 2, 4 and 8.

930: The base station sends the E-PDCCH to the UE in a subframe, and sends a PDSCH scheduled by the PDCCH to the UE.

When sending the E-PDCCH, the base station sends a reference signal of the E-PDCCH to the UE by using the determined reference signal port, where the E-PDCCH and the PDSCH invoked by the E-PDCCH are frequency-division multiplexed; and E-PDCCHs at a same start position but different aggregation levels correspond to different reference signal ports.

940: In a blind detection process, the UE performs channel estimation according to the reference signal, so as to demodulate the candidate E-PDCCH.

Assuming that the base station sends an E-PDCCH at aggregation level 2 and sends a reference signal by using DMRS port 8, when blindly detecting each candidate E-PDCCH at aggregation level 1, the UE tries to perform channel estimation based on DMRS port 7 and demodulate the E-PDCCH; however, in fact, the base station does not send the reference signal to the UE by using DMRS port 7; it is quite clear that the demodulated output is some random noise, so that CRC check is not possible to be successful, thereby avoiding that the UE mixes up candidate E-PDCCHs at different aggregation levels. This method also solves the foregoing problem that a start position of an E-PDCCH is judged incorrectly and the problem that E-PDCCHs at a same start position but different aggregation levels are mixed up.

950: If detecting its own E-PDCCH, the UE demodulates a corresponding PDSCH according to the downlink control information in the E-PDCCH, and feeds back in the uplink according to whether the PDSCH demodulation is correct. 950 in FIG. 9 is similar to 850 in FIG. 8, and is not described here any further.

Embodiment 9

FIG. 10 is a schematic flowchart of a process for transmitting downlink control information according to Embodiment 9 of the present invention. Embodiment 9 elaborates one or more steps of the methods in Embodiment 5 and Embodiment 6.

In order to support multiplexing of an E-PDCCH and a PDSCH, another problem to be solved is how to configure reference signals of the E-PDCCH and the PDSCH. One situation is that the E-PDCCH and the PDSCH are multiplexed in one PRB pair, where because the reference signal of the E-PDCCH and the PDSCH are sent on a same PRB pair, the reference signal of the E-PDCCH may possibly be used to demodulate the PDSCH. Another situation is that the E-PDCCH and the PDSCH are multiplexed in different PRB pairs of a same RBG; here, although a PRB pair where the E-PDCCH is located does not transmit the PDSCH, it is possible that channel estimation of the reference signal of the E-PDCCH is used to enhance, by means of interpolation, channel estimation accuracy of a PRB pair where the PDSCH is located. Under both the two situations, a method for multiplexing the reference signals of the E-PDCCH and the PDSCH needs to be defined.

Specifically, when a rank of the PDSCH is one of 5, 6 and 7, a DMRS port of at least a part of data flows of the PDSCH is expanded in time by using a walsh code with a length of 4. However, in order to ensure channel estimation performance of an E-PDCCH, a reference signal of the E-PDCCH uses DMRS ports 7, 8, 9 and 10, where the four DMRS ports may be processed based on a time extension of walsh codes with a length of 2. Therefore, when the reference signals of the E-PDCCH and the PDSCH are multiplexed, a problem needs to be solved that walsh codes used by the E-PDCCH and the PDSCH have different lengths.

In release 10, a maximum rank available for PDSCH transmission is 8; a PDSCH DMRS port is mapped to two RE sets bearing a reference signal, and these two sets are multiplexed based on FDM/TDM, and may multiplex at most four DMRS ports on each RE set. DMRS ports 7, 8, 11 and 13 are multiplexed in a CMD multiplexing mode on a first RE set, while DMRS ports 9, 10, 12 and 14 are multiplexed in a CMD multiplexing mode on a second RE set.

Referring to Table 1, Table 1 shows walsh codes used by the foregoing 8 DMRS ports respectively. Walsh codes of the four DMRS ports in the first RE set are used as an example, the first two elements and the last two elements of walsh codes of DMRS ports 7 and 8 are orthogonal respectively, so that DMRS ports 7 and 8 can be processed based on an orthogonal time extension with a length of 2; the first two elements and the last two elements of walsh codes of DMRS ports 7 and 13 are also orthogonal respectively, so that DMRS ports 7 and 13 can also be processed based on an orthogonal time extension with a length of 2. However, neither the first two elements nor the last two elements of walsh codes of DMRS ports 7 and 11 are orthogonal, but only an entirety of the four elements is orthogonal; and therefore, the two ports can only be processed based on an orthogonal time extension with a length of 4; if the UE still processes the ports according to an orthogonal time extension with a length of 2, great interference will be caused. Similarly, DMRS ports 8 and 11 can be processed based on an orthogonal time extension with a length of 2, while DMRS ports 8 and 13 can only be processed according to an orthogonal time extension with a length of 4.

TABLE 1

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

In order that a DMRS port with respect to an E-PDCCH is processed based on an orthogonal time extension with a length of 2, and also that, when a PDSCH with a rank of 5, 6 or 7 is scheduled by the E-PDCCH, a DMRS port with respect to a PDSCH is processed based on an orthogonal time extension with a length of 4, the present invention proposes the following limitation on the DMRS ports of the PDSCH; that is to say, when a DMRS port occupied by the E-PDCCH of the UE is v, a DMRS port p(v) is defined not to be used to demodulate the PDSCH, or another DMRS port is needed to replace the p(v), so that a reference signal port of the E-PDCCH and a reference signal port of the PDSCH are processed based on orthogonal time extensions with different lengths, and that the E-PDCCH and the PDSCH can be multiplexed normally. Particularly, p(v) is defined as follows:

$$p(v) = \begin{cases} 11, v = 7 \\ 13, v = 8 \\ 12, v = 9 \\ 14, v = 10 \end{cases}.$$

When the rank of the PDSCH is equal to 8, it may be considered not to support multiplexing of the reference signals of the E-PDCCH and the PDSCH. When the rank of the PDSCH is less than or equal to 4, the E-PDCCH and the PDSCH both use DMRS ports 7, 8, 9 and 10; as the four DMRS ports are all based on an orthogonal time extension with a length of 2, a problem that a DMRS port is not available as a result of another DMRS port does not exist.

1010: A base station performs CRC check code addition, scrambling, encoding and rate matching on downlink control information of a UE, so as to obtain modulation symbols of a PDCCH. 1010 of FIG. 10 is similar to 810 of FIG. 8, and is not described here any further.

1020: The base station performs physical resource mapping on an E-PDCCH and a PDSCH, and allocates reference signal ports of the E-PDCCH and the PDSCH, where the E-PDCCH and the PDSCH are frequency-division multiplexed in a same PRB pair or in different PRB pairs of a same RBG According to the embodiment of the present invention, two methods for allocating reference signal ports of an E-PDCCH and a PDSCH are provided.

A first method is to adjust, according to a DMRS port occupied by the E-PDCCH, a DMRS port of the PDSCH defined in LTE release 10. A principle of the method is to maximally multiplex PDSCH DMRS ports already defined in release 10; in other words, only a port that affects a DMRS port occupied by the E-PDCCH is not used; for example, when the E-PDCCH uses DMRS port 7, the PDSCH will not use DMRS port 11.

When the rank is less than or equal to 4, for transmission of a PDSCH, the definition of PDSCH DMRS ports in release 10 can be completely reused. Specifically, if a DMRS port used by an E-PDCCH is included in DMRS ports of a currently scheduled PDSCH, the DMRS port may also be configured to demodulate the E-PDCCH and the PDSCH; if the DMRS port used by the E-PDCCH is not included in the DMRS ports of the currently scheduled PDSCH, the DMRS port is only configured to demodulate the E-PDCCH. Optionally, if the definition of the PDSCH DMRS port in release 10 is followed, for the currently allocated PDSCH, the DMRS port used by the E-PDCCH is not included in the DMRS port of the currently scheduled PDSCH, but on a time-frequency resource where the DMRS port used by the E-PDCCH is located, another DMRS port based on CDM multiplexing is occupied by a reference signal of the PDSCH; here, the DMRS port used by the E-PDCCH may be used to replace another DMRS port on a same time-frequency resource to demodulate the PDSCH.

When the rank is 5, 6 or 7, and a DMRS port that the base station uses to send the E-PDCCH to the UE is v, according to the definition of the PDSCH DMRS port in release 10, if a DMRS port needed by the currently scheduled PDSCH is p(v), the p(v) is replaced with another DMRS port. Three preferred methods are described as follows, but the present invention is not limited to the three methods. When the rank is 5 or 6, the p(v) is replaced with another DMRS port using a same RE set as the p(v), that is, DMRS port p(v)+2; when the rank is 7, the p(v) is replaced with DMRS port 14. Optionally, when the rank is 5, 6 or 7, the p(v) is uniformly replaced with DMRS port 14. Optionally, when the rank R is 5, 6 or 7, the p(v) is uniformly replaced with DMRS port 7+R.

A second method is to use, according to the DMRS port v occupied by the E-PDCCH and the rank R of the currently scheduled PDSCH, R continuous DMRS ports starting from port v as PDSCH reference signal ports.

When the rank is less than or equal to 4, DMRS port 7+(v−7+r)mod 4 (r=0, . . . , R−1), may be used as a PDSCH reference signal port; that is to say, port 7+(v−7+r)mod 4 replaces PDSCH DMRS port 7+r defined in release 10. This method ensures that all E-PDCCH DMRS ports can be multiplexed for PDSCH demodulation. Optionally, when the rank is 2, in order to avoid extra resource overhead which results from that two DMRS ports are respectively mapped to two RE sets bearing a reference signal, an improved method may be used that, when the rank is 3 or 4, the foregoing method is still used; in other words, DMRS port 7+(v−7+r)mod 4 (r=0, . . . , R−1) may be used as the PDSCH reference signal port; however, when the rank is 2, two PDSCH DMRS ports are limited to be mapped to a same RE set; that is to say, DMRS ports v and v+(−1)$^{(v-7)mod 2}$ are used to transmit the PDSCH.

When the rank R is 5, 6 and 7, if the DMRS port that the base station uses to send the E-PDCCH to the UE is v, R continuous ports starting from DMRS port v are used; that is to say, DMRS port 7+(v−7+r)mod 8 (r=0, . . . , R−1) are used as PDSCH reference signal ports; and if the R DMRS ports include p(v), p(v) is replaced with another DMRS port.

Two preferred methods are described as follows, but the present invention is not limited to the two methods. For example, when the rank is 5, 6 or 7, p(v) is uniformly replaced with DMRS port 7+v mod 8. Optionally, when the rank R is 5, 6 and 7, p(v) is uniformly replaced with DMRS port 7+(v−7+R)mod 8.

1030: The base station sends the mapped PDCCH and PDSCH to the UE.

The base station sends the reference signal of the E-PDCCH by using a first reference signal port v. The base station sends a reference signal of the PDSCH by using at least one second reference signal port, and determines, according to the foregoing reference signal port allocation method, not to use a second reference signal port p(v) but to select another reference signal port to send the reference signal of the PDSCH, so that a reference signal port of the E-PDCCH and a reference signal port of the PDSCH are processed based on orthogonal time extensions with different lengths, where the first reference signal port is one of the at least one second reference signal port.

1040: The UE demodulates the E-PDCCH based on a channel estimation result.

The UE receives the reference signal of the E-PDCCH which is sent by the base station by using the first reference signal port v and the reference signal of the PDSCH which is sent by the base station by using at least one second reference signal port, where the PDSCH is invoked by the E-PDCCH. The UE performs channel estimation by using the reference signal of the E-PDCCH, so as to demodulate the E-PDCCH, and performs channel estimation by using the reference signal of the PDSCH, so as to demodulate the PDSCH. The UE determines, according to the foregoing reference signal port allocation method, not to use the reference signal of the PDSCH sent by the second reference signal port p(v) but to select another reference signal port to perform channel estimation, so that a reference signal port of the E-PDCCH and a reference signal port of the PDSCH are processed based on orthogonal time extensions with different lengths, where the first reference signal port is one of the at least one second reference signal port.

Similarly, the foregoing method for allocating reference signal ports of the E-PDCCH and the PDSCH may be configured in the UE; a specific method is similar to the method for allocating reference signal ports of the E-PDCCH and the PDSCH at a base station end, and is not described here any further.

1050: If detecting its own E-PDCCH, the UE demodulates a corresponding PDSCH according to the downlink control information in the E-PDCCH, and feeds back in the uplink according to whether the PDSCH demodulation is correct. 1050 in FIG. 10 is similar to 850 in FIG. 8, and is not described here any further.

The method for transmitting downlink control information according to the embodiment of the present invention is described above; with reference to FIG. 11 to FIG. 16, the following respectively describes a base station, a UE, and a system, as well as a corresponding storable medium and a corresponding computer program product, according to embodiments of the present invention.

Embodiment 10

Figure 11:
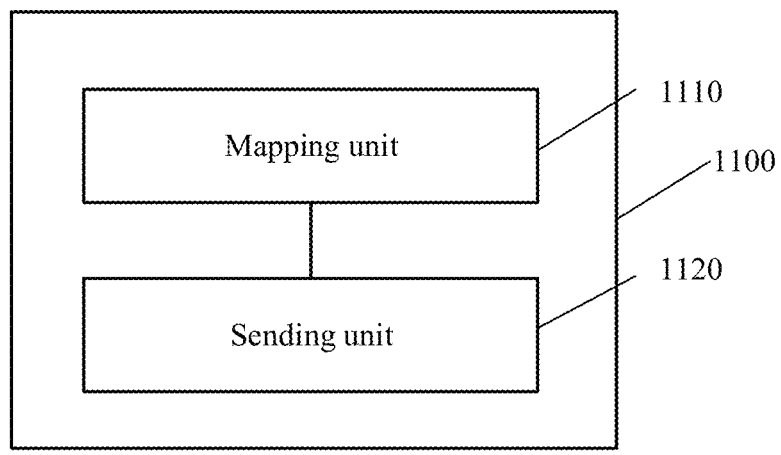
FIG. 11 is a schematic structural diagram of a base station according to Embodiment 10 of the present invention.

FIG. 11 is a schematic structural diagram of a base station 1100 according to Embodiment 10 of the present invention. The base station 1100 includes a mapping unit 1110 and a sending unit 1120. The embodiment in FIG. 11 elaborates one or more steps of the method in the embodiment in FIG. 2.

The mapping unit 1110 maps, according to an order of OFDM symbols used by an E-PDCCH of a UE, the E-PDCCH sequentially to REs used to transmit the E-PDCCH in each OFDM symbol. The sending unit 1120 sends the E-PDCCH to the UE by using the REs, where the E-PDCCH and a PDSCH invoked by the E-PDCCH are frequency-division multiplexed.

In the embodiment of the present invention, the E-PDCCH can be mapped, according to the order of OFDM symbols used by the E-PDCCH of the UE, sequentially to the REs used to transmit the E-PDCCH in each OFDM symbol, so that different eCCEs will not include a same E-PDCCH modulation symbol, thereby avoiding that the UE judges a start position of the E-PDCCH incorrectly. In addition, a problem that E-PDCCHs at a same start position but different aggregation levels are mixed up is also solved.

According to the embodiment of the present invention, the mapping unit 1110 maps, according to an order of L eCCEs allocated to the E-PDCCH in each OFDM symbol, the E-PDCCH sequentially to REs occupied by the L eCCEs in the OFDM symbol, where L is an integer.

Optionally, as another embodiment, the mapping unit 1110 maps, according to an order of subcarriers in each OFDM symbol, the E-PDCCH sequentially to REs occupied by L eCCEs allocated to the E-PDCCH.

For operations executed by means of hardware of the base station 1100 or cooperation of hardware and corresponding software of the base station 1100, reference may be made to the corresponding method in Embodiment 1, for example, 210 and 220 of the method in the foregoing Embodiment 1. However, to avoid repetition, the steps are not described here any further.

In addition, a computer readable media (or medium) is further provided, including a computer readable instruction that performs the following operation when executed, that is, an operation of executing 210 and 220 of the method the foregoing Embodiment 1.

In addition, a computer program product is further provided, including the foregoing computer readable medium.

Embodiment 11

Figure 12:
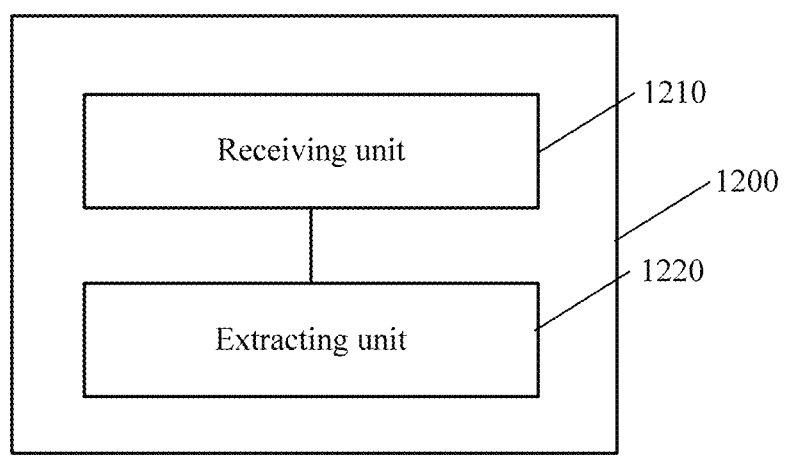
FIG. 12 is a schematic structural diagram of a user equipment according to Embodiment 11 of the present invention.

FIG. 12 is a schematic structural diagram of a UE 1200 according to Embodiment 11 of the present invention. The UE 1200 includes a receiving unit 1210 and an extracting unit 1220. The embodiment in FIG. 12 elaborates one or more steps of the method in the embodiment in FIG. 3.

The receiving unit 1210 receives a downlink subframe from a base station. The extracting unit 1220 extracts, in a blind detection process according to an order of OFDM symbols used by a candidate E-PDCCH in the downlink subframe, modulation symbols of the candidate E-PDCCH sequentially from REs used to transmit the candidate E-PDCCH in each OFDM symbol, and performs decoding and CRC check on the candidate E-PDCCH, where the E-PDCCH of the UE and a PDSCH invoked by the E-PDCCH of the UE are frequency-division multiplexed.

In the embodiment of the present invention, the E-PDCCH can be mapped, according to the order of OFDM symbols used by the E-PDCCH of the UE, sequentially to the REs used to transmit the E-PDCCH in each OFDM symbol, so that different eCCEs will not include a same E-PDCCH modulation symbol, thereby avoiding that the UE judges a start position of the E-PDCCH incorrectly. In addition, a problem that E-PDCCHs at a same start position but different aggregation levels are mixed up is also solved.

According to the embodiment of the present invention, the extracting unit 1220 sequentially extracts, according to an order of L eCCEs allocated to the candidate E-PDCCH in each OFDM symbol, modulation symbols of the candidate E-PDCCH from REs occupied by the L eCCEs in the OFDM symbol, where L is an integer.

Optionally, as another embodiment, the extracting unit 1220 sequentially extracts, according to an order of subcarriers in each OFDM symbol, the E-PDCCH from REs occupied by L eCCEs allocated to the E-PDCCH.

For operations executed by means of hardware of the UE 1200 or cooperation of hardware and corresponding software of the UE 1200, reference may be made to the corresponding method in Embodiment 2, for example, 310 and 320 of the method in the foregoing Embodiment 2. However, to avoid repetition, the steps are not described here any further.

In addition, a computer readable media (or medium) is further provided, including a computer readable instruction that performs the following operation when executed, that is, an operation of executing 310 and 320 of the method in the foregoing Embodiment 2.

Further, a computer program product is further provided, including the foregoing computer readable medium.

Embodiment 12

Figure 13:
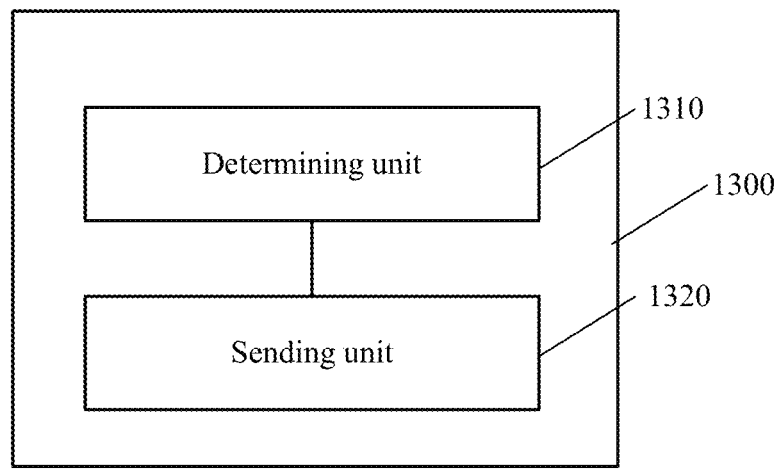
FIG. 13 is a schematic structural diagram of a base station according to Embodiment 12 of the present invention.

FIG. 13 is a schematic structural diagram of a base station 1300 according to Embodiment 12 of the present invention. The base station 1300 includes a determining unit 1310 and a sending unit 1320. The embodiment in FIG. 13 elaborates one or more steps of the method in the embodiment in FIG. 4.

The determining unit 1310 is configured to determine a reference signal port according to an aggregation level of an E-PDCCH of a UE, where E-PDCCHs at different aggregation levels correspond to different reference signal ports, and the aggregation level indicates the quantity of eCCEs included in the E-PDCCH. The sending unit 1320 is configured to send the E-PDCCH to the UE in a subframe, and send a reference signal of the E-PDCCH to the UE by using the determined reference signal port, where the E-PDCCH and a PDSCH invoked by the E-PDCCH are frequency-division multiplexed.

According to the embodiment of the present invention, reference signals of E-PDCCHs at different eCCE aggregation levels can be sent by using different DMRS ports, so that the UE can demodulate, according to a dedicated DMRS reference signal of an E-PDCCH at each aggregation level, the E-PDCCH correctly, thereby avoiding a problem that the UE judges a start position of the E-PDCCH incorrectly. In addition, a problem that E-PDCCHs at a same start position but different aggregation levels are mixed up is also solved.

According to the embodiment of the present invention, E-PDCCHs at a same start position but different aggregation levels in the subframe correspond to different reference signal ports.

Further, the determining unit 1310 may be specifically configured to select, according to the aggregation level of the physical downlink control channel E-PDCCH of the UE, one or more reference signal ports from a reference signal port set corresponding to the aggregation level as a reference signal port corresponding to the aggregation level, where reference signal ports selected for E-PDCCHs at different aggregation levels are different.

Further, the at a same start position in the subframe may include: at a same start position in a same physical resource block pair or different physical resource block pairs.

Further, E-PDCCHs, corresponding to different user equipments UEs, at a same aggregation level, and occupying a same physical resource, correspond to different reference signal ports.

For operations executed by means of hardware of the base station 1300 or cooperation of hardware and corresponding software of the base station 1300, reference may be made to the corresponding method in Embodiment 3, for example, 410 and 420 of the method in the foregoing Embodiment 3. However, to avoid repetition, the steps are not described here any further.

In addition, a computer readable media (or medium) is further provided, including a computer readable instruction that performs the following operation when executed, that is, an operation of executing 410 and 420 of the method in the foregoing Embodiment 3.

In addition, a computer program product is further provided, including the foregoing computer readable medium.

Embodiment 13

Figure 14:
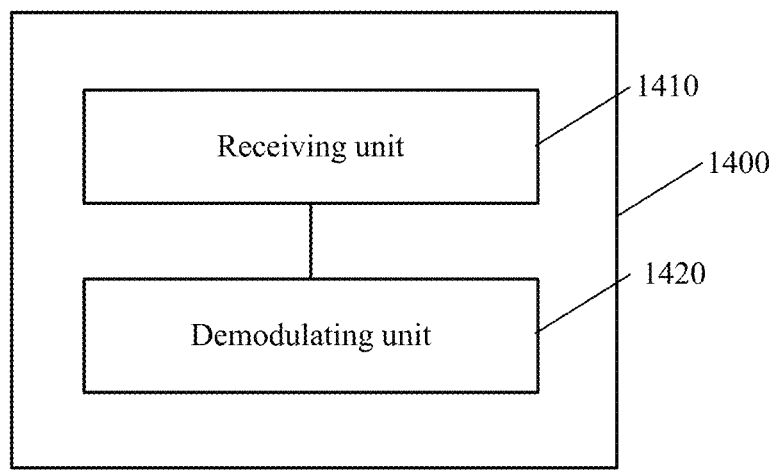
FIG. 14 is a schematic structural diagram of a user equipment according to Embodiment 13 of the present invention.

FIG. 14 is a schematic structural diagram of a UE 1400 according to Embodiment 13 of the present invention. The UE 1400 includes a receiving unit 1410 and a demodulating unit 1420. The embodiment in FIG. 14 elaborates one or more steps of the method in the embodiment in FIG. 5.

The receiving unit 1410 receives, from a reference signal port in a subframe, a reference signal of a candidate E-PDCCH sent by a base station, where candidate E-PDCCHs at different aggregation levels correspond to different reference signal ports, and the aggregation level indicates the quantity of eCCEs included in the candidate E-PDCCH. The demodulating unit 1420 performs channel estimation according to the reference signal, so as to demodulate the E-PDCCH, where the candidate E-PDCCH and a PDSCH invoked by the candidate E-PDCCH are frequency-division multiplexed.

According to the embodiment of the present invention, reference signals of E-PDCCHs at different eCCE aggregation levels can be sent by using different DMRS ports, so that the UE can demodulate, according to a dedicated DMRS reference signal of an E-PDCCH at each aggregation level, the E-PDCCH correctly, thereby avoiding a problem that the UE judges a start position of the E-PDCCH incorrectly. In addition, a problem that E-PDCCHs at a same start position but different aggregation levels are mixed up is also solved.

According to the embodiment of the present invention, candidate E-PDCCHs at a same start position but different aggregation levels in the subframe correspond to different reference signal ports.

For operations executed by means of hardware of the UE 1400 or cooperation of hardware and corresponding software of the UE 1400, reference may be made to the corresponding method in Embodiment 4, for example, 510 and 520 of the method in the foregoing Embodiment 4. However, to avoid repetition, the steps are not described here any further.

In addition, a computer readable media (or medium) is further provided, including a computer readable instruction that performs the following operation when executed, that is, an operation of executing 510 and 520 of the method in the foregoing Embodiment 4.

In addition, a computer program product is further provided, including the foregoing computer readable medium.

Embodiment 14

Figure 15:
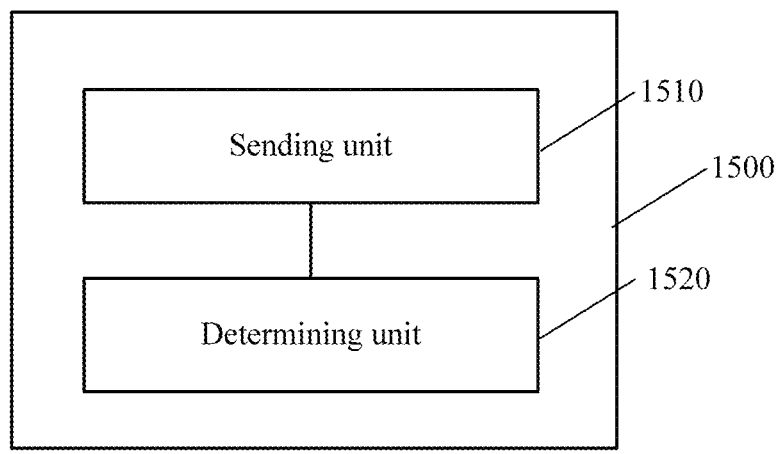
FIG. 15 is a schematic structural diagram of a base station according to Embodiment 14 of the present invention.

FIG. 15 is a schematic structural diagram of a base station 1500 according to Embodiment 14 of the present invention. The base station 1500 includes a sending unit 1510 and a determining unit 1520. The embodiment in FIG. 15 elaborates one or more steps of the method in the embodiment in FIG. 6.

The sending unit 1510 sends a reference signal of the E-PDCCH by using a first reference signal port v, and send a reference signal of the PDSCH by using at least one second reference signal port. The determining unit 1520 determines not to use a second reference signal port p(v) to send the reference signal of the PDSCH, so that a reference signal port of the E-PDCCH and a reference signal port of the PDSCH are processed based on orthogonal time extensions with different lengths, where the E-PDCCH and the PDSCH are frequency-division multiplexed, the first reference signal port is one of the at least one second reference signal port, and v and p(v) are serial numbers of the reference signal ports.

According to the embodiment of the present invention, when using a reference signal port to send a reference signal of a PDSCH results that a reference signal port of an E-PDCCH and the reference signal port of the PDSCH cannot be processed based on orthogonal time extensions with different lengths, the reference signal port may be not used to send the reference signal of the PDSCH, so that the reference signal of the PDSCH and a reference signal of the E-PDCCH are multiplexed normally.

According to the embodiment of the present invention, the at least one second reference signal port includes at least one of PDSCH reference signal ports 7, 8, 9, 10, 11, 12, 13 and 14 defined in LTE release 10, the first reference signal port includes an E-PDCCH reference signal port 7, 8, 9, or 10 defined in LTE release 10, and $$p(v) = \begin{cases} 11, v = 7 \\ 13, v = 8 \\ 12, v = 9 \\ 14, v = 10 \end{cases}.$$

According to the embodiment of the present invention, when a rank R of the PDSCH is less than or equal to 4, the sending unit 1510 sends the reference signal of the PDSCH by using a PDSCH reference signal port defined in LTE release 10; or when the rank R of the PDSCH is one of 5, 6 and 7, the sending unit 1510 sends the reference signal of the PDSCH by using a PDSCH reference signal port defined in LTE release 1, and when needing to send the reference signal of the PDSCH by using the second reference signal port p(v) to, the sending unit 1510 replaces the reference signal port p(v) with another available reference signal port among the PDSCH reference signal ports, where R is an integer.

Optionally, as another embodiment, when a rank R of the PDSCH is less than or equal to 4, the sending unit 1510 may send the reference signal of the PDSCH by using R reference signal ports 7+(v−7+r) mod 4 starting from the reference signal port v, where r=0, . . . , R−1, and R is an integer; or, when the rank R of the PDSCH is equal to one of 5, 6 and 7, the sending unit 1510 may send the reference signal of the PDSCH by using R reference signal ports 7+(v−7+r) mod 8 starting from the reference signal port v, and when the R reference signal ports include the reference signal port p(v), replace the reference signal port p(v) with another reference signal port among the PDSCH reference signal ports, where r=0, . . . , R−1.

For operations executed by means of hardware of the base station 1500 or cooperation of hardware and corresponding software of the base station 1500, reference may be made to the corresponding method in Embodiment 5, for example, 610 and 620 of the method in the foregoing Embodiment 5. However, to avoid repetition, the steps are not described here any further.

In addition, a computer readable media (or medium) is further provided, including a computer readable instruction that performs the following operation when executed, that is, an operation of executing 610 and 620 of the method in the foregoing Embodiment 5.

In addition, a computer program product is further provided, including the foregoing computer readable medium.

Embodiment 15

Figure 16:
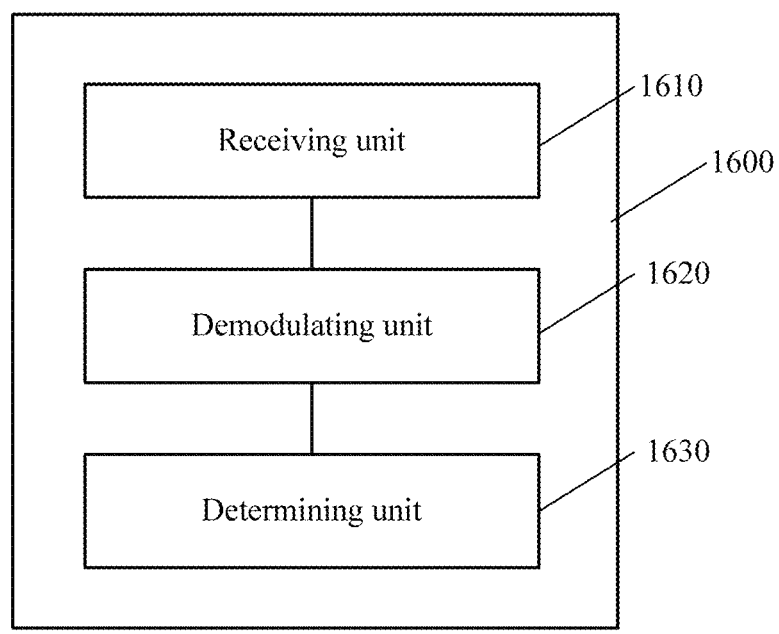
FIG. 16 is a schematic structural diagram of a user equipment according to Embodiment 15 of the present invention.

FIG. 16 is a schematic structural diagram of a UE 1600 according to Embodiment 15 of the present invention. The UE 1600 includes a receiving unit 1610, a demodulating unit 1620, and a determining unit 1630. The embodiment in FIG. 16 elaborates one or more steps of the method in the embodiment in FIG. 7.

The receiving unit 1610 is configured to receive a reference signal of an E-PDCCH which is sent by a base station by using a first reference signal port v and a reference signal of a PDSCH which is sent by the base station by using at least one second reference signal port, where the PDSCH is invoked by the E-PDCCH. The demodulating unit 1620 is configured to perform channel estimation by using the reference signal of the E-PDCCH, so as to demodulate the E-PDCCH, and perform channel estimation by using the reference signal of the PDSCH, so as to demodulate the PDSCH. The determining unit 1630 is configured to determine not to use the reference signal of the PDSCH sent by the second reference signal port p(v) to perform channel estimation, so that a reference signal port of the E-PDCCH and a reference signal port of the PDSCH are processed based on orthogonal time extensions with different lengths, where the E-PDCCH and the PDSCH are frequency-division multiplexed, the first reference signal port is one of the at least one second reference signal port, and v and p(v) are serial numbers of the reference signal ports.

According to the embodiment of the present invention, the at least one second reference signal port includes at least one of PDSCH reference signal ports 7, 8, 9, 10, 11, 12, 13 and 14 defined in LTE release 10, the first reference signal port includes an E-PDCCH reference signal port 7, 8, 9, or 10 defined in LTE release 10, and $$p(v) = \begin{cases} 11, v = 7 \\ 13, v = 8 \\ 12, v = 9 \\ 14, v = 10 \end{cases}.$$

According to the embodiment of the present invention, when a rank R of the PDSCH is less than or equal to 4, the demodulating unit 1620 performs channel estimation by using a reference signal of the PDSCH sent by a PDSCH reference signal port defined in LTE release 10; or when the rank R of the PDSCH is one of 5, 6 and 7, the demodulating unit 1620 performs channel estimation by using a reference signal of the PDSCH sent by a PDSCH reference signal port defined in LTE release 10, and when the UE needs to perform channel estimation by using the reference signal of the PDSCH sent by the second reference signal port p(v), replaces the reference signal port p(v) with another available reference signal port among the PDSCH reference signal ports to perform channel estimation, where R is an integer.

Optionally, as another embodiment, when a rank R of the PDSCH is less than or equal to 4, the demodulating unit 1620 may perform channel estimation by using reference signals of the PDSCH sent by R reference signal ports 7+(v−7+r) mod 4 starting from the reference signal port v, where r=0, . . . , R−1, and R is an integer; or, when the rank R of the PDSCH is equal to one of 5, 6 and 7, the demodulating unit 1620 may to perform channel estimation by using reference signals of the PDSCH sent by R reference signal ports 7+(v−7+r) mod 8 starting from the reference signal port v, and when the R reference signal ports include the reference signal port p(v), replace the reference signal port p(v) with another reference signal port among the PDSCH reference signal ports to perform channel estimation, where r=0, . . . , R−1.

For operations executed by means of hardware of the UE 1600 or cooperation of hardware and corresponding software of the UE 1600, reference may be made to the corresponding method in Embodiment 6, for example, 710, 720 and 730 of the method in the foregoing Embodiment 6. However, to avoid repetition, the steps are not described here any further.

In addition, a computer readable media (or medium) is further provided, including a computer readable instruction that performs the following operation when executed, that is, an operation of executing 710 and 720 of the method in the foregoing Embodiment 6.

In addition, a computer program product is further provided, including the foregoing computer readable medium.

A person of ordinary skill in the art may recognize that units and algorithmic steps of examples described with reference to the embodiments disclosed herein may be implemented by means of electronic hardware or combination of computer software and electronic hardware. Whether the functions are executed by hardware or software depends on particular applications and design constraint conditions of the technical solutions. A person skilled in the art may use different methods to implement the described functions for each particular application, but it should not be considered that the implementation goes beyond the scope of the present invention.

A person skilled in the art can clearly understand that, for convenience and conciseness of description, for specific working processes of the described systems, apparatuses and units, reference may be made to corresponding processes in the foregoing method embodiments, which will not be described here any further.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separated parts may be or may not be physically separate, and the parts displayed as units may or may not be physical units, may be located in one position, or may be distributed on a plurality of network units. A part of or all of the units may be selected according to actual needs to achieve the objectives of the solutions of the embodiments.

In addition, the functional units of each embodiment in the present invention may be integrated in a physical unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in the embodiments of the present invention. The foregoing storage medium includes: any mediums that can store program code, such as a USB flash drive, a removable hard disk, a read-only memory (ROM), a random access memory (RAM), a magnetic disk, or an optical disc.

Embodiment 16

In LTE R-11, the quantity of aggregation levels corresponding to a UE is M; if E-PDCCHs at N aggregation levels among the M aggregation levels are mixed up, correct reception of an E-PDCCH or a PDSCH by the UE will be affected, where M is not less than N, and M and N are integers.

Downlink control channels E-PDCCHs have M aggregation levels, where each aggregation level of N aggregation levels thereof corresponds to a reference signal port set. With respect to a UE, for each aggregation level of the N aggregation levels, a base station selects a reference signal port from a reference signal port set corresponding to the aggregation level as a reference signal port corresponding to the aggregation level; reference signal ports selected for the N aggregation levels of the UE are different from each other; and the reference signal port set at least includes one reference signal port.

The base station sends the E-PDCCH to the UE in a subframe, and sends a reference signal of the E-PDCCH to the UE by using a determined reference signal port, where N is less than or equal to M.

Figure 17:
FIG. 17 is a schematic diagram of physical resources according to Embodiment 16 of the present invention.

For E-PDCCH transmission, each physical resource block pair may include 2 or 4 physical eCCEs, where each physical eCCE bears eCCEs of one ePDCCH, as shown in FIG. 17. An E-PDCCH at aggregation level L includes L logical eCCEs; the L logical eCCEs are mapped to L physical eCCEs; and control information of the E-PDCCH is transmitted on the L physical eCCEs.

If each PRB pair includes 4 eCCEs, according to a size of control signaling, the numbers of PRB pairs occupied by an ePDCCH corresponding to aggregation levels 2, 4, 8, 12, 16 and above 16 are respectively 1, 1, 2, 3, 4 and above 4. For example, when a UE detects an E-PDCCH at aggregation level 8, if the first 4 eCCEs are detected successfully, the UE regards the aggregation level of the E-PDCCH as 4 and the quantity of PRB pairs occupied as 1. In fact, the quantity of PRB pairs occupied by the E-PDCCH is 2. In this case, the UE may possibly regard the rest 4 eCCEs as resources to transmit a PDSCH, and receive the PDSCH on the rest 4 eCCEs, which may cause incorrect reception of the PDSCH. Similarly, if each PRB pair includes two eCCEs, according to a size of control signaling, the numbers of PRB pairs occupied by an ePDCCH corresponding to aggregation levels 2, 4, 8, 12, 16 and above 16 are respectively 1, 2, 4, 6, 8 and above 8. When the E-PDCCH is received, the foregoing problem that aggregation levels are mixed up will also occur. Aggregation levels that are possible to be mixed up for a UE are possibly N of the aggregation levels 2, 4, 8, 12, 16 and above 16, and each aggregation level of the N aggregation levels corresponds to a reference signal port set. A reference signal port corresponding to aggregation level L among the N aggregation levels of the UE is one or more reference signal ports selected from a reference signal port set corresponding to the aggregation level L. Reference signal ports selected for the N aggregation levels of the UE are different from each other.

Figure 18:
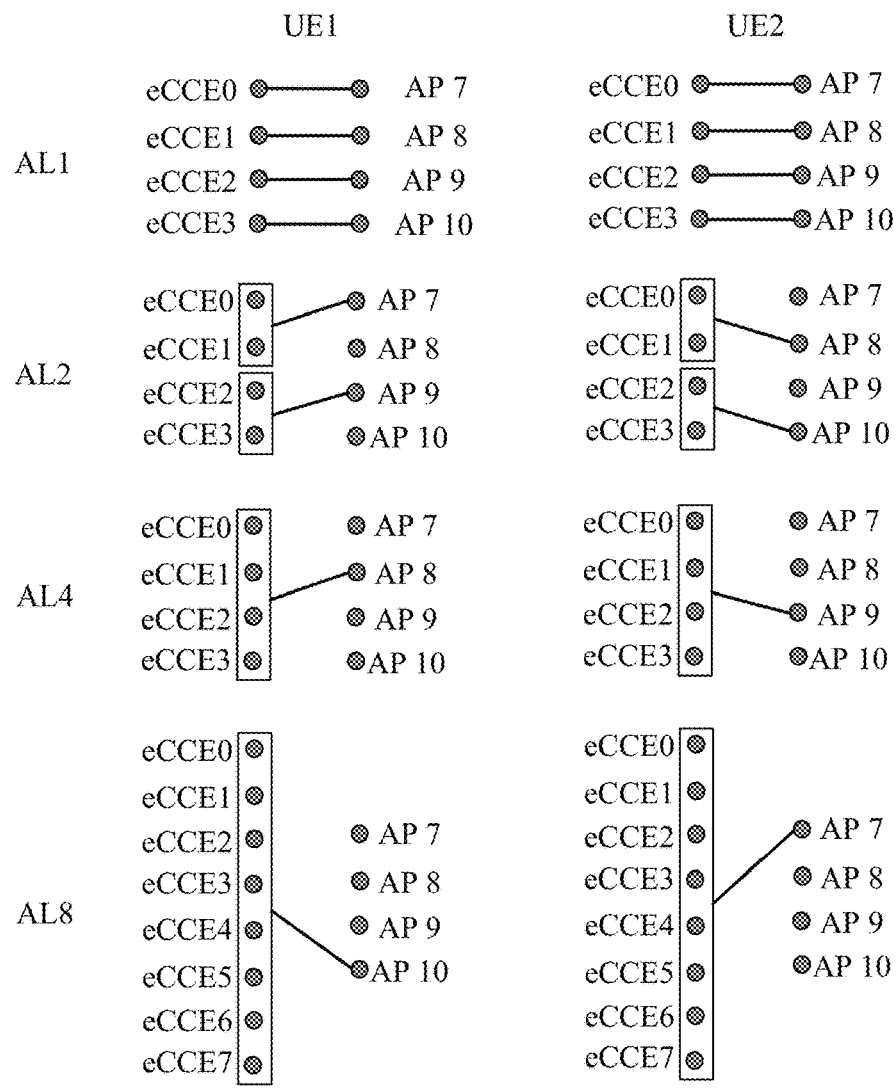
FIG. 18 is a first schematic diagram of an aggregation level and reference signal port correspondence according to Embodiment 16 of the present invention.

To be specific, for example:

If each physical resource block includes four physical eCCEs, a reference signal port set corresponding to aggregation level 2 may be set 1, a reference signal port set corresponding to aggregation level 4 may be set 2, and a reference signal port set corresponding to aggregation level 8 may be set 3. Reference signal ports included in each set may be completely different, partially the same or the completely same. The quantity of reference signal ports respectively included in set 1, set 2 and set 3 is at least 1. For any UE, a reference signal port selected from set 1 is r, a reference signal port selected from set 2 is s, and a reference signal port selected from set 3 is t. A reference signal port corresponding to aggregation level 2 of the UE is r, a reference signal port corresponding to aggregation level 4 of the UE is s, and a reference signal port corresponding to aggregation level 8 of the UE is t, where r, s and t are different from each other. For example, set 1 is {reference signal port 7, reference signal port 8, reference signal port 9, reference signal port 10}, set 2 is {reference signal port 8, reference signal port 9}, and set 3 is {reference signal port 7, reference signal port 10}. As shown in FIG. 18, for UE1 (or all UEs in cell 1, aggregation level 2 corresponds to reference signal port 7 or 9, aggregation level 4 corresponds to reference signal port 8, and aggregation level 8 corresponds to reference signal port 10; for UE2 (or all UEs in cell 2, aggregation level 2 corresponds to reference signal port 8 or 10, aggregation level 4 corresponds to reference signal port 9, and aggregation level 8 corresponds to reference signal port 7. It can be seen that, if reference signal ports are configured in such a manner, for a same UE, aggregation levels 2, 4 and 8 correspond to different reference signal ports, which can avoid the problem that the aggregation levels are mixed up. Further, E-PDCCHs, corresponding to different user equipments UEs, at a same aggregation level, and occupying a same physical resource, correspond to different reference signal ports, and can support multi-user transmission. For example, for aggregation level 2, physical resources that the first E-PDCCHs of UE1 and UE2 occupy are eCCE0 and eCCE1, while physical resources that the second E-PDCCHs of UE1 and UE2 occupy are eCCE2 and eCCE3. For aggregation level 2, the first E-PDCCHs of UE1 and UE2 correspond to different reference signal ports, so as to support simultaneous transmission of UE1 and UE2 on eCCE0 and eCCE1; and the second E-PDCCHs of UE1 and UE2 correspond to different reference signal ports, so as to support simultaneous transmission of UE1 and UE2 on eCCE2 and eCCE3.

Figure 19:
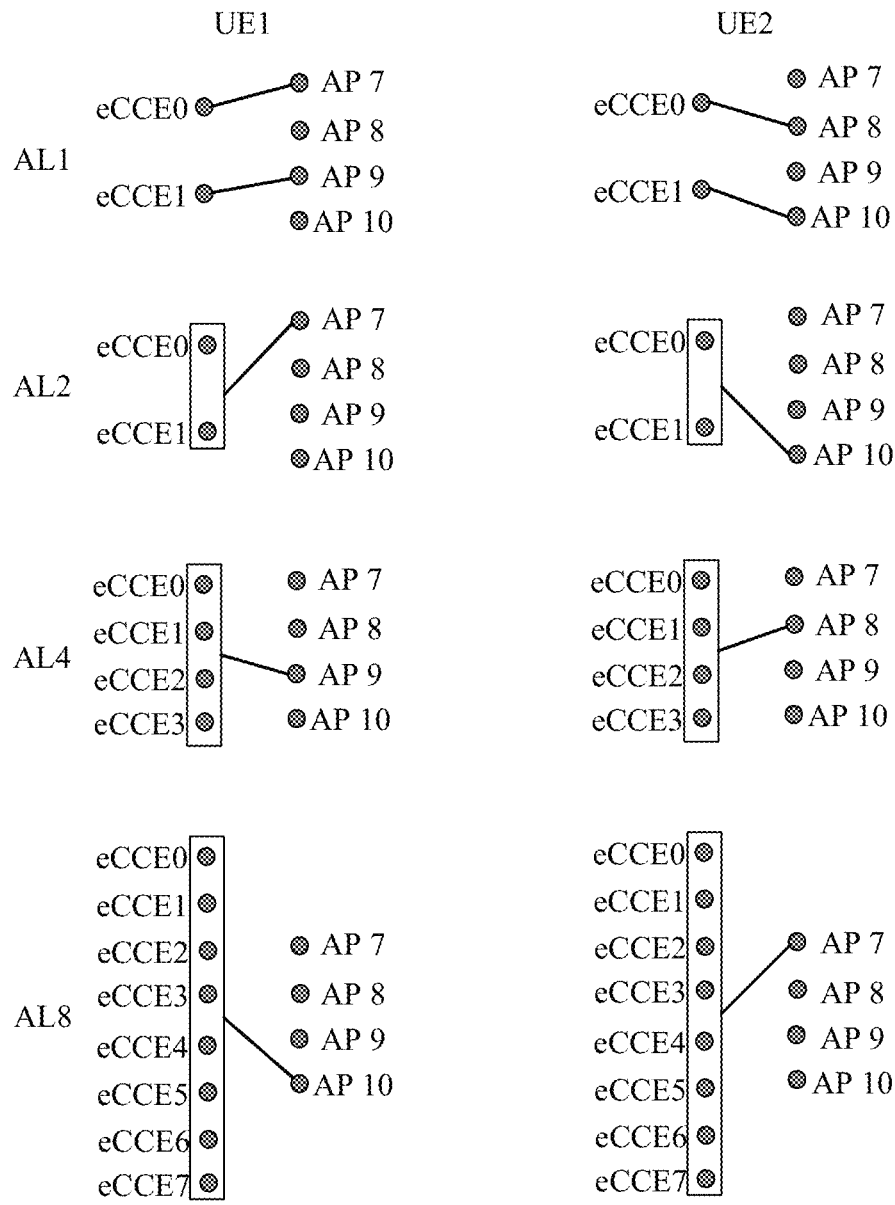
FIG. 19 is a second schematic diagram of an aggregation level and reference signal port correspondence according to Embodiment 16 of the present invention.

If each physical resource block includes two physical eCCEs, a reference signal port set corresponding to aggregation level 2 is set 1, a reference signal port set corresponding to aggregation level 4 is set 2, and a reference signal port set corresponding to aggregation level 8 is set 3. Reference signal ports included in each set may be completely different, partially the same or completely the same. The quantity of reference signal ports respectively included in set 1, set 2 and set 3 is at least 1. For any UE, a reference signal port selected from set 1 is r, a reference signal port selected from set 2 is s, and a reference signal port selected from set 3 is t. A reference signal port corresponding to aggregation level 2 of the UE is r, a reference signal port corresponding to aggregation level 4 of the UE is s, and a reference signal port corresponding to aggregation level 8 of the UE is t, where r, s and t are different from each other. For example, set 1 is {reference signal port 7, reference signal port 10}, set 2 is {reference signal port 8, reference signal port 9}, and set 3 is {reference signal port 7, reference signal port 10}. As shown in FIG. 19, for UE1 (or all UEs in cell 1, aggregation level 2 corresponds to reference signal port 7, aggregation level 4 corresponds to reference signal port 9, and aggregation level 8 corresponds to a reference signal port 10; for UE2 (or all UEs in cell 2, aggregation level 2 corresponds to reference signal port 10, aggregation level 4 corresponds to reference signal port 8, and aggregation level 8 corresponds to reference signal port 7. It can be seen that, if reference signal ports are configured in such a manner, for a same UE, aggregation levels 2, 4 and 8 correspond to different reference signal ports, which can avoid the problem that the aggregation levels are mixed up. Further, E-PDCCHs, corresponding to different user equipments UEs, at a same aggregation level, and occupying a same physical resource, correspond to different reference signal ports, and can support multi-user transmission.

Further, that reference signal ports selected for the N aggregation levels of the UE are different from each other may specifically be: reference signal ports selected for E-PDCCHs at the N aggregation levels of the UE, which are mapped to a same physical resource start position are different from each other, which may also be understood that, E-PDCCHs at a same start position but different aggregation levels in the subframe correspond to different reference signal ports.

Further, the at a same start position in the subframe may include: at a same start position in a same physical resource block pair or different physical resource block pairs. The "at a same start position in the subframe" herein may all be understood as above, and is not described any further.

Figure 20:
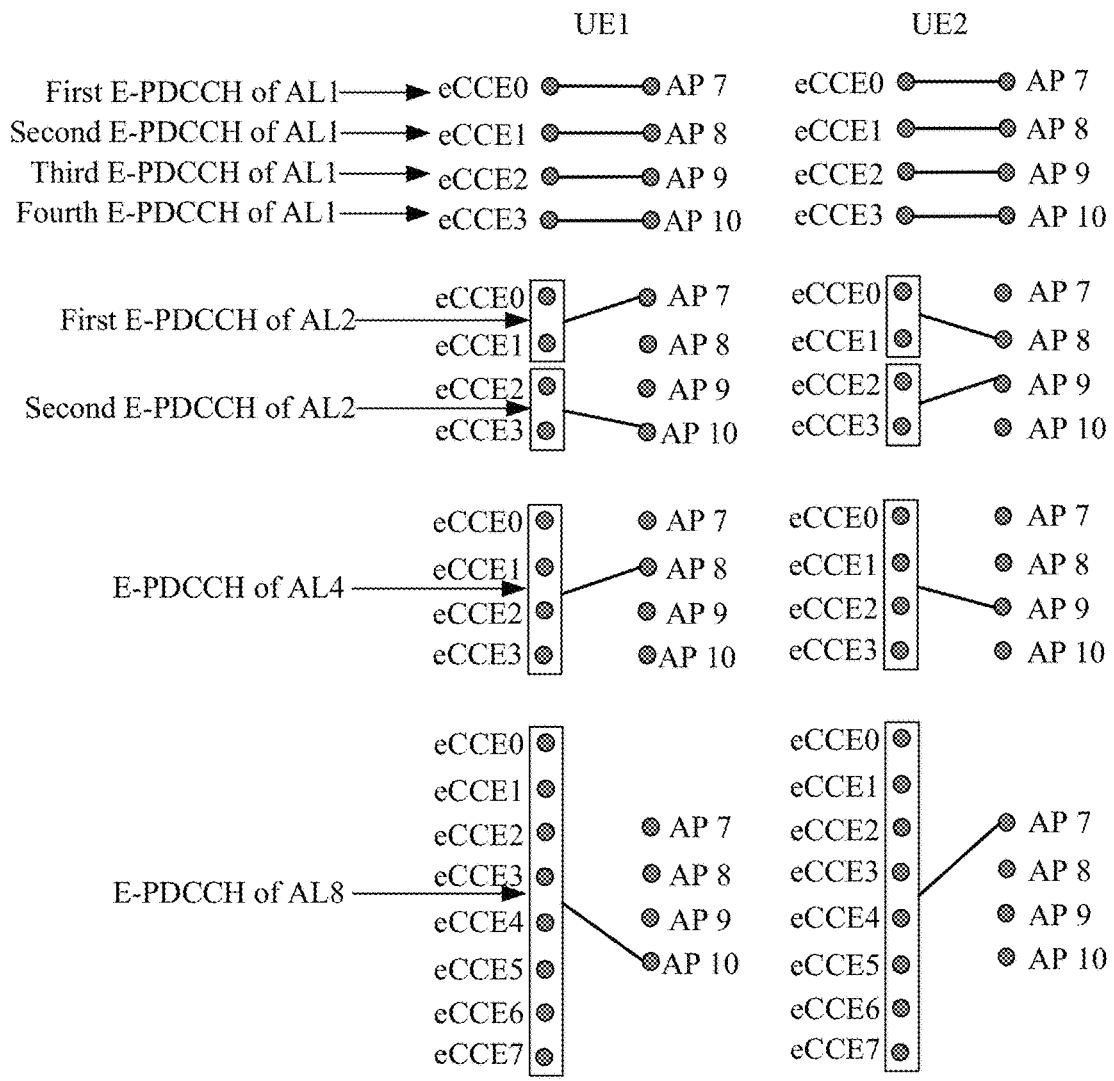
FIG. 20 is a third schematic diagram of an aggregation level and reference signal port correspondence according to Embodiment 16 of the present invention.

As shown in FIG. 20, for UE1 and UE2, in a same PRB pair, two E-PDCCHs are at aggregation level 2, where a first E-PDCCH is mapped to eCCE0 and eCCE1, where eCCE0 is a start position; and a second E-PDCCH is mapped to eCCE2 and eCCE3, where eCCE2 is a start position. One E-PDCCH is at aggregation level 4, which is mapped to eCCE0, eCCE1, eCCE2 and eCCE3, where eCCE0 is a start position. One E-PDCCH is at aggregation level 8, which is mapped to eCCE0, eCCE1, eCCE2 and eCCE3, as well as eCCE0, eCCE1, eCCE2 and eCCE3 of another PRB pair, where eCCE0 is a start position.

Figure 21:
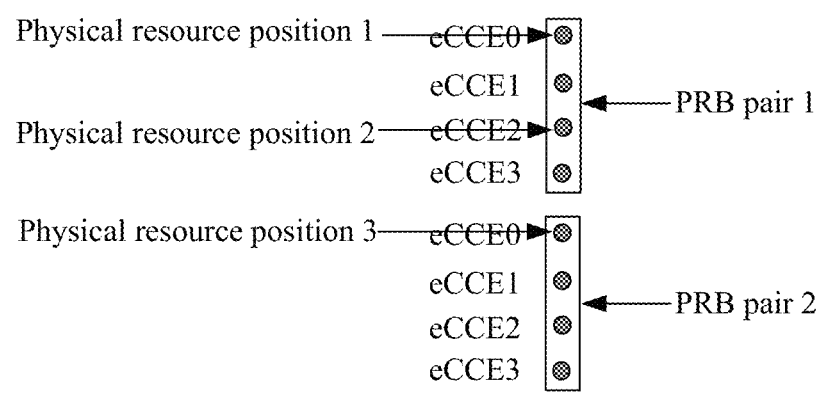
FIG. 21 is a schematic diagram describing a start position according to Embodiment 16 of the present invention.

Then, for UE1, reference signal ports selected for the two E-PDCCHs at aggregation level 2 are reference signal ports 7 and 10 respectively, a reference signal port selected for the E-PDCCH at aggregation level 4 is reference signal port 8, and a reference signal port selected for the E-PDCCH at aggregation level 8 is reference signal port 10. It can be seen that reference signal ports selected for E-PDCCHs at aggregation levels 2, 4 and 8 and mapped to a same physical resource start position (that is eCCE0 in this embodiment) are respectively reference signal ports 7, 8 and 10, which are different from each other. For UE2, reference signal ports selected for the two E-PDCCHs at aggregation level 2 are reference signal ports 8 and 9 respectively, a reference signal port selected for the E-PDCCH at aggregation level 4 is reference signal port 9, and a reference signal port selected for the E-PDCCH at aggregation level 8 is reference signal port 7. It can be seen that reference signal ports selected for E-PDCCHs at aggregation levels 2, 4 and 8 and mapped to a same physical resource start position (that is eCCE0 in this embodiment) are respectively reference signal ports 8, 9 and 7, which are different from each other. The at a same physical resource start position may be understood as at a same start position in the subframe. Further, the at a same start position in the subframe includes: at a same start position in a same physical resource block pair or different physical resource block pairs. That is to say, the at a same start position in the subframe may be at a same start position in different PRB pairs or at a same start position in identical PRB pairs. As shown in FIG. 21, physical resource position 1 is eCCE0 of PRB pair 1, physical resource position 2 is eCCE0 of PRB pair 2, and physical resource position 3 is eCCE0 of PRB pair 3. A same start position in different PRB pairs means that positions of the PRB pairs are different, but start positions in the PRB pairs are the same; for example, if one start position is physical resource position 1, and another start position is physical resource position 3, and it may be called at a same start position in different PRB pairs. A same start position in identical PRB pairs means that positions of PRB pairs are the same and start positions in the PRB pairs are also the same; for example, if the two start positions both are physical resource position 1 or the two start positions both are physical resource position 3, it may be called at a same start position in identical PRB pairs.

The methods of configuring a reference signal port set and selecting a reference signal port from the reference signal port set are shared by the base station and the UE, and may be defined and configured by the system previously, or notified to the UE by the base station, or obtained according to a parameter of the UE, or the like.

Understandably, the selected reference signal ports are only used for description; a person skilled in the art may deduce another reference signal port set or an example of selecting a reference signal port from the set, which is not limited in the present invention.

It should be noted that, due to limited space, mutual reference may be made to corresponding embodiments of the present invention, and same content will not be described repetitively.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting downlink control information, comprising:
    mapping, by a base station, a physical downlink control channel (PDCCH) of a user equipment device (UE) to resource elements allocated for transmitting the PDCCH, wherein the resource elements are in L control channel elements (CCEs) allocated to the PDCCH, wherein L is an aggregation level and is greater than or equal to 1; and
    transmitting, by the base station, the PDCCH to the UE by using the resource elements mapped with the PDCCH;
    wherein one or more orthogonal frequency division multiplexing (OFDM) symbols are used by the PDCCH, and each OFDM symbol comprises one or more resource elements that are allocated for transmitting the PDCCH;
    wherein the PDCCH carries the downlink control information; and
    wherein mapping the PDCCH to the resource elements in the L CCEs comprises:
        following an order of the OFDM symbols, in each OFDM symbol, mapping the PDCCH to the resource elements occupied by the L CCEs and allocated for transmitting the PDCCH according to an order of subcarriers in the OFDM symbol.

2. The method according to claim 1, wherein the PDCCH is demodulated by the UE based on a demodulation reference signal (DMRS).

3. The method according to claim 1, wherein the PDCCH is an enhanced PDCCH (E-PDCCH), and the CCEs are enhanced CCEs (eCCEs).

4. The method according to claim 1, wherein mapping the PDCCH to the resource elements occupied by the L CCEs and allocated for transmitting the PDCCH according to an order of subcarriers in the OFDM symbol comprises:
    mapping modulation symbols of the PDCCH with index numbers of $j_0+[0, \ldots, N-1]$ sequentially to a set R of resource elements in the OFDM symbol, wherein the set R is a set of resource elements occupied by the L CCEs and allocated for transmitting the PDCCH in the OFDM symbol;
    wherein $j_0$ is a start position of the modulation symbols of the PDCCH mapped in the OFDM symbol; N is the quantity of the resource elements in the set R; and L, N and $j_0$ are integers.

5. The method according to claim 1, wherein mapping the PDCCH to the resource elements allocated for transmitting the PDCCH comprises:
    mapping modulation symbols of the PDCCH to the resource elements allocated for transmitting the PDCCH.

6. The method according to claim 5, wherein the modulation symbols of the PDCCH is obtained by performing a plurality of operations on the PDCCH, wherein the operations comprises scrambling and modulation.

7. A method for receiving downlink control information, comprising:
    receiving, by a user equipment device (UE), a downlink subframe from a base station; and
    extracting, by the UE, the downlink control information carried in a physical downlink control channel (PDCCH) from resource elements allocated for transmitting the PDCCH in the downlink subframe,
    wherein the resource elements are in L control channel elements (CCEs) allocated to the PDCCH, L is an aggregation level and is greater than or equal to 1, one or more orthogonal frequency division multiplexing (OFDM) symbols are used by the PDCCH, and each OFDM symbol comprises one or more resource elements that are allocated for transmitting the PDCCH; and wherein extracting the downlink control information carried in the PDCCH from the resource elements in the L CCEs comprises:

following an order of the OFDM symbols, in each OFDM symbol, extracting the PDCCH from the resource elements occupied by the L CCEs and allocated for transmitting the PDCCH according to an order of subcarriers in the OFDM symbol.

8. The method according to claim 7, wherein the PDCCH is demodulated by the UE based on a demodulation reference signal (DMRS).

9. The method according to claim 7, wherein the PDCCH is an enhanced PDCCH (E-PDCCH), and the CCEs are enhanced CCEs (eCCEs).

10. The method according to claim 7, wherein extracting the PDCCH from the resource elements occupied by the L CCEs and allocated for transmitting the PDCCH according to an order of subcarriers in the OFDM symbol comprises:

extracting modulation symbols of the PDCCH with index numbers of $j_0+[0, \ldots ,N-1]$ sequentially from a set R of resource elements in the OFDM symbol, wherein the set R is a set of resource elements occupied by the L CCEs and mapped with the modulation symbols of the PDCCH in the OFDM symbol;

wherein $j_0$ is a start position of the modulation symbols of the PDCCH mapped in the OFDM symbol; N is the quantity of the resource elements in the set R; and L, N and $j_0$ are integers.

11. The method according to claim 7, wherein extracting the downlink control information carried in the PDCCH from the resource elements allocated for transmitting the PDCCH in the downlink subframe comprises:

extracting modulation symbols of the PDCCH from the resource elements allocated for transmitting the PDCCH in the downlink subframe.

12. A base station, comprising one or more processors, wherein the one or more processors are coupled to one or more memories storing program instructions for execution by the processors;

wherein, by executing the program instructions, the one or more processors are configured to perform operations of:

controlling the base station to map a physical downlink control channel (PDCCH) of a user equipment device (UE) to resource elements allocated for transmitting the PDCCH, wherein the resource elements are in L control channel elements (CCEs) allocated to the PDCCH, wherein L is an aggregation level and is greater than or equal to 1; and controlling the base station to transmit the PDCCH to the UE by using the resource elements mapped with the PDCCH;

wherein one or more orthogonal frequency division multiplexing (OFDM) symbols are used by the PDCCH, and each OFDM symbol comprises one or more resource elements that are allocated for transmitting the PDCCH;

wherein the PDCCH carries downlink control information; and wherein the operation of controlling the base station to map the PDCCH to the resource elements in the L CCEs comprises controlling the base station to:

following an order of the OFDM symbols, in each OFDM symbol, map the PDCCH to the resource elements occupied by the L CCEs and allocated for transmitting the PDCCH according to an order of subcarriers in the OFDM symbol.

13. The base station according to claim 12, wherein the PDCCH is demodulated by the UE based on a demodulation reference signal (DMRS).

14. The base station according to claim 12, wherein the PDCCH is an enhanced PDCCH (E-PDCCH), and the CCEs are enhanced CCEs (eCCEs).

15. The base station according to claim 12, wherein the operation of mapping the PDCCH to the resource elements occupied by the L CCEs and allocated for transmitting the PDCCH according to an order of subcarriers in the OFDM symbol comprises:

mapping modulation symbols of the PDCCH with index numbers of $j_0+[0, \ldots ,N-1]$ sequentially to a set R of resource elements in the OFDM symbol, wherein the set R is a set of resource elements occupied by the L CCEs and allocated for transmitting the PDCCH in the OFDM symbol;

wherein $j_0$ is a start position of the modulation symbols of the PDCCH mapped in the OFDM symbol; N is the quantity of the resource elements in the set R; and L, N and $j_0$ are integers.

16. The base station according to claim 12, wherein the operation of controlling the base station to map the PDCCH to the resource elements allocated for transmitting the PDCCH comprises:

controlling the base station to map modulation symbols of the PDCCH to the resource elements allocated for transmitting the PDCCH.

17. The base station according to claim 16, wherein the modulation symbols of the PDCCH is obtained by performing a plurality of operations on the PDCCH, wherein the operations comprises scrambling and modulation.

18. A user equipment device (UE), comprising one or more processors, wherein the one or more processors are coupled to one or more memories storing program instructions for execution by the processors;

wherein, by executing the program instructions, the one or more processors are configured to perform operations of:

controlling the UE to receive a downlink subframe from a base station; and controlling the UE to extract downlink control information carried in a physical downlink control channel (PDCCH) from resource elements allocated for transmitting the PDCCH in the downlink subframe;

wherein the resource elements are in L control channel elements (CCEs) allocated to the PDCCH, L is an aggregation level and is greater than or equal to 1, one or more orthogonal frequency division multiplexing (OFDM) symbols are used by the PDCCH, and each OFDM symbol comprises one or more resource elements that are allocated for transmitting the PDCCH; and wherein the operation of controlling the UE to extract the downlink control information carried in the PDCCH from the resource elements in the L CCEs comprises controlling the UE to:

following an order of the OFDM symbols, in each OFDM symbol, extract the PDCCH from the resource elements occupied by the L CCEs and allocated for transmitting the PDCCH according to an order of subcarriers in the OFDM symbol.

19. The UE according to claim 18, wherein the PDCCH is demodulated by the apparatus based on a demodulation reference signal (DMRS).

20. The UE according to claim 18, wherein the PDCCH is an enhanced PDCCH (E-PDCCH), and the CCEs are enhanced CCEs (eCCEs).

21. The UE according to claim 18, wherein the operation of controlling the UE to extract the PDCCH from the resource elements occupied by the L CCEs and allocated for transmitting the PDCCH according to an order of subcarriers in the OFDM symbol comprises:
controlling the UE to extract modulation symbols of the PDCCH with index numbers of $j_0+[0, \ldots ,N-1]$ sequentially from a set R of resource elements in the OFDM symbol, wherein the set R is a set of resource elements occupied by the L CCEs and mapped with the modulation symbols of the PDCCH in the OFDM symbol;
wherein $j_0$ is a start position of the modulation symbols of the PDCCH mapped in the OFDM symbol; N is the quantity of the resource elements in the set R; and L, N and $j_0$ are integers.

22. The UE according to claim 18, wherein the operation of controlling the UE to extract the downlink control information carried in the PDCCH from the resource elements allocated for transmitting the PDCCH in the downlink subframe comprises:
controlling the UE to extract modulation symbols of the PDCCH from the resource elements allocated for transmitting the PDCCH in the downlink subframe.

23. An apparatus in a base station, comprising one or more processors, wherein the one or more processors are coupled to one or more memories storing program instructions for execution by the processors;
wherein by executing the program instructions, the one or more processors are configured to perform operations of:
controlling the base station to map a physical downlink control channel (PDCCH) of a user equipment device (UE) to resource elements allocated for transmitting the PDCCH, wherein the resource elements are in L control channel elements (CCEs) allocated to the PDCCH, wherein L is an aggregation level and is greater than or equal to 1; and
controlling the base station to transmit the PDCCH to the UE by using the resource elements mapped with the PDCCH;
wherein one or more orthogonal frequency division multiplexing (OFDM) symbols are used by the PDCCH, and each OFDM symbol comprises one or more resource elements that are allocated for transmitting the PDCCH;
wherein the PDCCH carries downlink control information; and
wherein the operation of controlling the base station to map the PDCCH to the resource elements in the L CCEs comprises controlling the base station to:
following an order of the OFDM symbols, in each OFDM symbol, map the PDCCH to the resource elements occupied by the L CCEs and allocated for transmitting the PDCCH according to an order of subcarriers in the OFDM symbol.

24. The apparatus according to claim 23, wherien the PDCCH is demodulated by the UE based on a demodulation reference signal (DMRS).

25. The apparatus according to claim 23, wherein the PDCCH is an enhanced PDCCH (E-PDCCH), and the CCEs are enhanced CCEs (eCCEs).

26. The apparatus according to claim 23, wherein the operations of controlling the base station to map the PDCCH to the resource elements allocated for transmitting the PDCCH comprises:
controlling the base station to map modulation symbols of the PDCCH to the resource elements allocated for transmitting the PDCCH.

27. The apparatus according to claim 26, wherein the modulation symbols of the PDCCH is obtained by performing a plurality of operations on the PDCCH, wherein the operations comprises scrambling and modulation.

28. An apparatus in a user equipment device (UE), comprising one or more processors, wherein the one or more processors are coupled to one or more memories storing program instructions for execution by the processors;
wherein, by executing the program instructions, the one or more processors are configured to perform operations of:
controlling the UE to receive a downlink subframe from a base station; and
controlling the UE to extract downlink control information carried in a physical downlink control channel (PDCCH) from resource elements allocated for transmitting the PDCCH in the downlink subframe;
wherein the resource elements are in L control channel elements (CCEs) allocated to the PDCCH, L is an aggregation level and is greater than or equal to 1, one or more orthogonal frequency division multiplexing (OFDM) symbols are used by the PDCCH, and each OFDM symbol comprises one or more resource elements that are allocated for transmitting the PDCCH; and
wherein the operation of controlling the UE to extract the downlink control information carried in the PDCCH from the resource elements in the L CCEs comprises controlling the UE to:
following an order of the OFDM symbols, in each OFDM symbol, extract the PDCCH from the resource elements occupied by the L CCEs and allocated for transmitting the PDCCH according to an order of subcarriers in the OFDM symbol.

29. The apparatus according to claim 28, wherein the PDCCH is demodulated by the apparatus based on a demodulation reference signal (DMRS).

30. The apparatus according to claim 28, wherein the PDCCH is an enhanced PDCCH (E-PDCCH), and the CCEs are enhanced CCEs (eCCEs).

31. The apparatus accordin to claim 28, wherein the operation of controlling the UE to extract the downlink control information carried in the PDCCH from the resource elements allocated for transmitting the PDCCH in the downlink subframe comprises:
controlling the UE to extract modulation symbols of the PDCCH from the resource elements allocated for transmitting the PDCCH in the downlink subframe.

* * * * *